(12) United States Patent
Sano et al.

(10) Patent No.: US 12,344,344 B2
(45) Date of Patent: Jul. 1, 2025

(54) CONTROLLER OF VEHICLE AND METHOD OF CONTROLLING VEHICLE

(71) Applicant: KAWASAKI MOTORS, LTD., Akashi (JP)

(72) Inventors: Katsuya Sano, Akashi (JP); Shohei Terai, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 18/584,817

(22) Filed: Feb. 22, 2024

(65) Prior Publication Data

US 2024/0286701 A1 Aug. 29, 2024

(30) Foreign Application Priority Data

Feb. 24, 2023 (JP) .................................. 2023-27430

(51) Int. Cl.
*B62K 11/00* (2006.01)

(52) U.S. Cl.
CPC .................... *B62K 11/00* (2013.01)

(58) Field of Classification Search
CPC ........... F16H 2061/0462; F16H 63/502; F16H 61/04; F16H 59/46; B62K 11/00
See application file for complete search history.

(56) References Cited

U.S. PATENT DOCUMENTS

| | | | | |
|---|---|---|---|---|
| 8,180,540 | B2 * | 5/2012 | Morselli | F16H 61/47 |
| | | | | 476/1 |
| 8,554,429 | B2 * | 10/2013 | Matsuda | F16H 63/50 |
| | | | | 701/53 |
| 10,112,616 | B2 * | 10/2018 | Inoue | F16H 61/0437 |
| 10,144,414 | B2 * | 12/2018 | Miller | B60W 10/06 |
| 10,316,934 | B2 * | 6/2019 | Takahashi | F16H 3/30 |
| 11,415,219 | B2 * | 8/2022 | Sano | F16H 63/18 |
| 11,447,001 | B2 * | 9/2022 | Nishiyabu | B60K 6/387 |

(Continued)

FOREIGN PATENT DOCUMENTS

| | | | | |
|---|---|---|---|---|
| EP | 1584847 | A2 * | 10/2005 | ......... F16H 57/0006 |
| EP | 1584847 | B1 | 3/2010 | |

(Continued)

*Primary Examiner* — Paul N Dickson
*Assistant Examiner* — Maxwell L Meshaka
(74) *Attorney, Agent, or Firm* — Alleman Hall & Tuttle LLP

(57) ABSTRACT

A controller of a vehicle is a controller of a vehicle including: a driving source; a driving wheel; a first transmitting structure; a second transmitting structure which is connected to the first transmitting structure so as to be movable relative to the first transmitting structure in a power transmitting direction within a range of a play; a clutch located on the power transmitting path and between the driving source and the first transmitting structure; and a clutch actuator. The controller determines whether or not a relative position of the first transmitting structure relative to the second transmitting structure changes. When it is determined that the relative position changes, the controller controls the clutch actuator to change a power transmission rate such that collision force of one of the first transmitting structure and the second transmitting structure with respect to the other by the change in the relative position is reduced.

9 Claims, 10 Drawing Sheets

(56) References Cited

U.S. PATENT DOCUMENTS

| | | | | |
|---|---|---|---|---|
| 11,597,472 B2* | 3/2023 | Ueda | | F16H 63/502 |
| 11,772,744 B2* | 10/2023 | Ueda | | F16H 63/46 |
| | | | | 74/473.1 |
| 11,866,030 B2* | 1/2024 | Tada | | B60W 20/15 |
| 12,031,627 B2* | 7/2024 | Sano | | F16H 61/0403 |
| 12,098,769 B2* | 9/2024 | Sano | | F16H 61/0403 |
| 2010/0082207 A1* | 4/2010 | Morselli | | F16H 59/46 |
| | | | | 701/51 |
| 2011/0130932 A1* | 6/2011 | Takenaka | | F16H 63/50 |
| | | | | 701/58 |
| 2012/0022751 A1 | 1/2012 | Matsuda | | |
| 2015/0329011 A1 | 11/2015 | Kawai | | |
| 2017/0067543 A1* | 3/2017 | Takahashi | | F16H 63/18 |
| 2017/0267249 A1* | 9/2017 | Inoue | | F16H 61/688 |
| 2021/0001706 A1* | 1/2021 | Nishiyabu | | B62M 7/02 |
| 2021/0010591 A1* | 1/2021 | Sano | | B62M 25/02 |
| 2022/0111927 A1* | 4/2022 | Ueda | | B62J 45/41 |
| 2022/0194356 A1* | 6/2022 | Tada | | B60W 10/08 |
| 2023/0045819 A1* | 2/2023 | Kim | | F16H 59/46 |
| 2023/0182863 A1* | 6/2023 | Ueda | | B62M 11/06 |
| | | | | 74/473.1 |
| 2023/0184326 A1* | 6/2023 | Sano | | F16H 61/0437 |
| | | | | 74/335 |
| 2023/0204100 A1* | 6/2023 | Sano | | F16H 61/0403 |
| 2024/0208485 A1* | 6/2024 | Sano | | B60W 20/30 |
| 2024/0209937 A1* | 6/2024 | Mizuno | | F16H 63/18 |
| 2024/0286701 A1* | 8/2024 | Sano | | F16H 61/04 |
| 2024/0288037 A1* | 8/2024 | Sano | | B60W 30/1884 |

FOREIGN PATENT DOCUMENTS

| | | | | |
|---|---|---|---|---|
| EP | 3882093 A1 | 9/2021 | | |
| GB | 2370324 A * | 6/2002 | | F16H 59/70 |
| GB | 2370327 A * | 6/2002 | | F16H 59/70 |
| WO | WO-2007085861 A1 * | 8/2007 | | F16D 48/06 |
| WO | 2014102869 A1 | 7/2014 | | |

* cited by examiner

CONTROLLER OF VEHICLE AND METHOD OF CONTROLLING VEHICLE

CROSS-REFERENCE TO RELATED APPLICATIONS

This application claims priority to and the benefit of Japanese Patent Application No. 2023-27430 filed on Feb. 24, 2023, the entire disclosure of which is incorporated herein by reference.

BACKGROUND OF THE INVENTION

Field of the Invention

The present disclosure relates to a controller of a vehicle including a power transmitting device having a play, and a method of controlling the vehicle.

Description of the Related Art

International Publication No. 2014/102869 discloses a motorcycle including a dog transmission. In the transmission of the motorcycle, an engaging piece of a dog gear is engaged with an engagement groove of an output-side gear with a play. In a dog gear transmission, each time the vehicle accelerates or decelerates, one of two power transmitting members having a play may move relative to the other and collide with the other. This type of collision force tends to influence traveling feeling of a rider. Therefore, it is desired to reduce the collision force.

SUMMARY OF THE INVENTION

An object of the present disclosure is to provide a controller of a vehicle and a method of controlling the vehicle each of which can reduce collision force generated due to a play.

To solve the above problems, a controller of a vehicle according to one aspect of the present disclosure is a controller of a vehicle, the vehicle including: a driving source that generates power; a driving wheel; a first transmitting structure located on a power transmitting path through which the power is transmitted between the driving source and the driving wheel; a second transmitting structure which is located on the power transmitting path and between the first transmitting structure and the driving wheel, is connected to the first transmitting structure so as to be movable relative to the first transmitting structure in a power transmitting direction within a range of a play, and contacts the first transmitting structure in the power transmitting direction to receive the power from the first transmitting structure; a clutch which is located on the power transmitting path and between the driving source and the first transmitting structure and changes a power transmission rate of the power transmitted from the driving source to the first transmitting structure; and a clutch actuator that operates the clutch. The controller includes processing circuitry configured to: determine whether or not a relative position of the first transmitting structure relative to the second transmitting structure changes; and when it is determined that the relative position changes, control the clutch actuator to change the power transmission rate such that collision force of one of the first transmitting structure and the second transmitting structure with respect to the other by the change in the relative position is reduced.

A method of controlling a vehicle according to one aspect of the present disclosure is a method of controlling a vehicle, the vehicle including: a driving source that generates power; a driving wheel; a first transmitting structure located on a power transmitting path through which the power is transmitted between the driving source and the driving wheel; a second transmitting structure which is located on the power transmitting path and is connected to the first transmitting structure so as to be movable relative to the first transmitting structure within a range of a play; and a clutch which is located on the power transmitting path and between the driving source and the first transmitting structure and changes a power transmission rate of the power transmitted from the driving source to the first transmitting structure. The method includes: determining whether or not a power transmitting direction between the first transmitting structure and the second transmitting structure is switched; and when it is determined that the power transmitting direction between the first transmitting structure and the second transmitting structure is switched, adjusting a power transmission rate of the clutch such that a speed difference between the first transmitting structure and the second transmitting structure is reduced.

A controller of a vehicle according to another aspect of the present disclosure is a controller of a vehicle, the vehicle including: a power inputter including a driving source; a driving wheel; a first transmitting structure which is located on a power transmitting path and to which positive torque is given from the power inputter, the power transmitting path being a path through which power is transmitted between the power inputter and the driving wheel; a second transmitting structure which is located on the power transmitting path and between the first transmitting structure and the driving wheel and is connected to the first transmitting structure so as to be movable relative to the first transmitting structure in a power transmitting direction within a range of a play; and a sub power source that gives negative torque to the first transmitting structure, the negative torque being torque acting in a direction opposite to a direction in which the positive torque acts. The controller includes processing circuitry configured to: determine whether or not a relative position of the first transmitting structure relative to the second transmitting structure changes; and when it is determined that the relative position changes, control the power inputter and the sub power source such that collision force of one of the first transmitting structure and the second transmitting structure with respect to the other by the change in the relative position is reduced in at least a part of a period from a start time point of the change in the relative position to a termination time point of the change in the relative position.

The above object, other objects, features, and advantages of the present disclosure will be made clear by the following detailed explanation of preferred embodiments with reference to the attached drawings.

DETAILED DESCRIPTION

Hereinafter, embodiments will be described with reference to the drawings.

Embodiment 1

Figure 1:
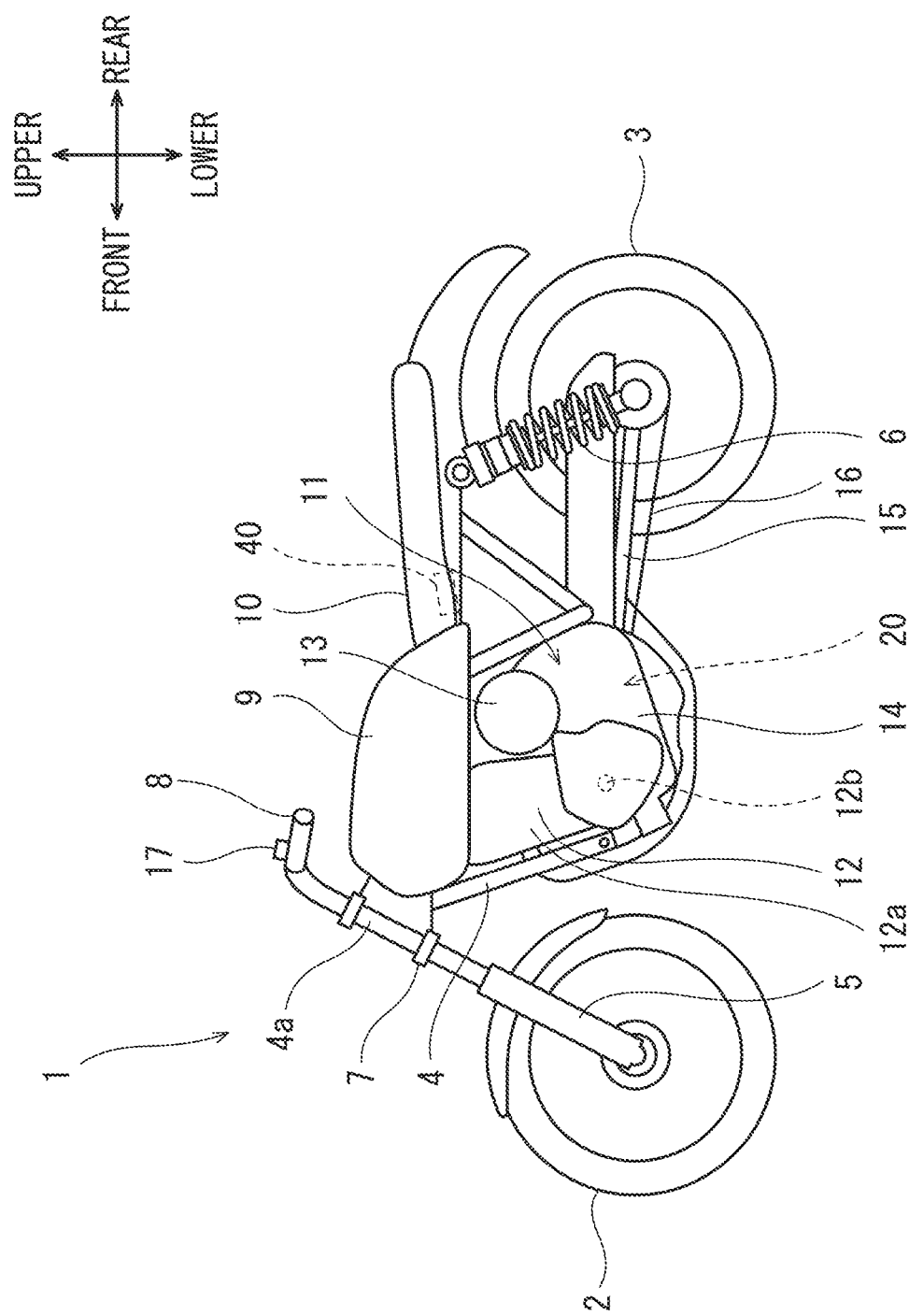
FIG. 1 is a left side view of a motorcycle including a controller according to Embodiment 1.

FIG. 1 is a left side view of a motorcycle 1 including a controller 40 according to Embodiment 1. The motorcycle 1 is one example of a straddled vehicle straddled by a rider, and is a hybrid vehicle. Directions described below are based on directions from the viewpoint of the rider of the motorcycle 1. A front-rear direction corresponds to a vehicle longitudinal direction, and a left-right direction corresponds to a vehicle width direction. Moreover, in the following description, the motorcycle 1 may be simply referred to as a vehicle 1.

The motorcycle 1 includes a front wheel 2, a rear wheel 3, a vehicle body frame 4, a front suspension 5 connecting the front wheel 2 to a front portion of the vehicle body frame 4, and a rear suspension 6 connecting the rear wheel 3 to a rear portion of the vehicle body frame 4. The front wheel 2 is a driven wheel, and the rear wheel 3 is a driving wheel. The front suspension 5 is coupled to a bracket 7 located away from the front suspension 5 in an upper-lower direction. A steering shaft connected to the bracket 7 is supported by a head pipe 4a so as to be angularly displaceable. The head pipe 4a is part of the vehicle body frame 4. A handlebar 8 held by hands of the rider is located at the steering shaft. A fuel tank 9 is located behind the handlebar 8. A seat 10 on which the rider is seated is located behind the fuel tank 9.

A swing arm 15 is supported by the vehicle body frame 4 so as to be angularly displaceable. The swing arm 15 supports the rear wheel 3 and extends in the front-rear direction. Moreover, a power unit 11 is mounted on the vehicle body frame 4 so as to be located between the front wheel 2 and the rear wheel 3. The power unit 11 includes a first driving source and a second driving source that are two traveling driving sources (also called prime movers) that generate power. The first driving source is an engine 12 that is an internal combustion engine. The second driving source is a drive motor 13 that is an electric motor that can rotate forwardly and reversely. The engine 12 is one example of a "driving source," and the drive motor 13 is one example of a "sub power source."

The engine 12 includes a cylinder 12a and a crank shaft 12b coupled to a piston in the cylinder 12a. The crank shaft 12b of the engine 12 is accommodated in a crank case 14. Moreover, a gear transmission 20 is located behind the engine 12. The gear transmission 20 is accommodated in the crank case 14. A shift switch 17 is located at a left grip of the handlebar 8. The shift switch 17 changes a gear stage that is a shift position of the gear transmission 20. The controller 40 is located under the seat 10. The controller 40 controls the engine 12, the drive motor 13, a below-described clutch actuator 19, and a below-described shift actuator 30.

Figure 2:
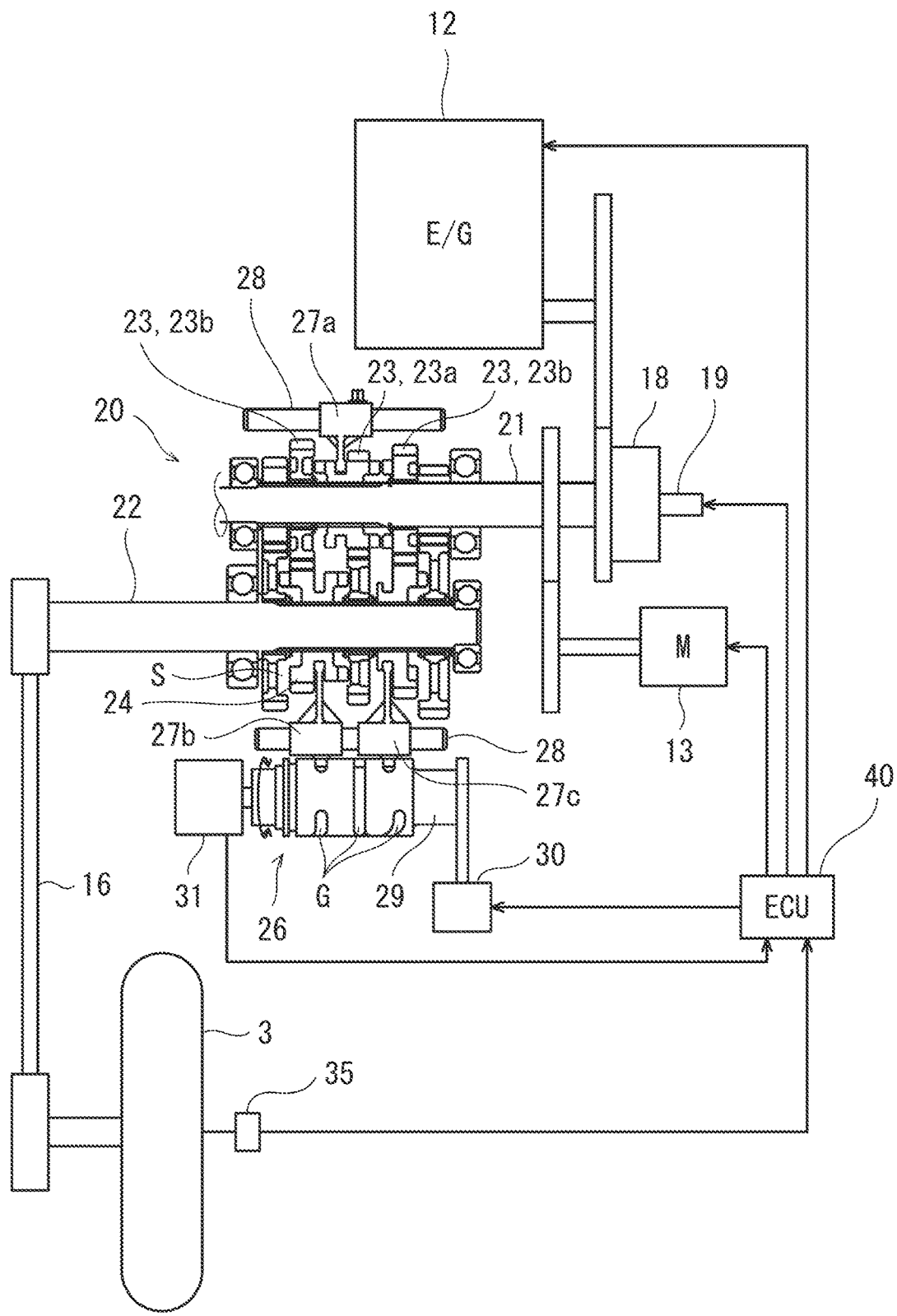
FIG. 2 is a schematic diagram of a power system of the motorcycle of FIG. 1.

FIG. 2 is a schematic diagram of a power system of the motorcycle 1 of FIG. 1. The gear transmission 20 includes an input shaft 21, an output shaft 22, and transmission gear pairs 23. At least one of driving power of the first driving source and driving power of the second driving source can be transmitted to the input shaft 21.

Specifically, the gear transmission 20 is located on an engine power transmitting path through which the power is transmitted between the engine 12 that is the first driving source and the rear wheel 3 that is the driving wheel. A main clutch 18 is interposed on the engine power transmitting path so as to be located between the engine 12 and the input shaft 21 of the gear transmission 20. In the following description, the main clutch 18 may be simply referred to as the clutch 18. Rotational power of the crank shaft 12b of the engine 12 is input to the input shaft 21 through the main clutch 18.

Moreover, the gear transmission 20 is located on a motor power transmitting path through which the power is transmitted between the drive motor 13 that is the second driving source and the rear wheel 3 that is the driving wheel. The main clutch 18 is not located on the motor power transmitting path. To be specific, the drive motor 13 that is the second driving source is connected to the input shaft 21 so as to transmit the power to the input shaft 21 without through the main clutch 18. The rotational power of a rotating shaft of the drive motor 13 is input to the input shaft 21. To be specific, in the present embodiment, both of the engine 12 that is the first driving source and the drive motor 13 that is the second driving source can simultaneously transmit the power to the input shaft 21.

The main clutch 18 is driven by the clutch actuator 19 and cuts or establishes the engine power transmitting path. In the present embodiment, the main clutch 18 is realized by a friction clutch. For example, the main clutch 18 is a single disc clutch or a multiple disc clutch.

A disengaged state of the main clutch 18 denotes a state where the power is not transmitted between the engine 12 and the input shaft 21 of the gear transmission 20. An engaged state of the main clutch 18 denotes a state where the power is completely transmitted between the engine 12 and the input shaft 21. The main clutch 18 changes from the disengaged state to the engaged state through a half-engaged state. The half-engaged state of the main clutch 18 denotes a state where the power is partially transmitted between the engine 12 and the input shaft 21.

The clutch actuator 19 is an actuator that changes the degree of engagement of the main clutch 18, i.e., a power transmission rate that is a transmission rate of the power transmitted from the engine 12 to the input shaft 21. The power transmission rate of the main clutch 18 is a value that increases as frictional force generated at the main clutch 18 increases. The disengaged state of the main clutch 18 denotes a state where the power transmission rate of the main clutch 18 is 0%. The engaged state of the main clutch 18 denotes a state where the power transmission rate of the main clutch 18 is 100%. The half-engaged state of the main clutch 18 denotes a state where the power transmission rate of the main clutch 18 is more than 0% and less than 100%.

In other words, the main clutch 18 includes a pair of contact members that can contact each other and separate from each other, and the main clutch 18 can transmit the rotational power from one of the contact members to the other by the frictional force generated between the pair of contact members. One of the pair of contact members is a rotating body located close to the engine 12 that is the first driving source, and the other is a rotating body located close to the input shaft 21. The pair of contact members may be called a clutch plate and a friction plate. The engaged state of the main clutch 18 denotes a state where the rotational power is transmitted without the occurrence of slipping between the pair of contact members. Moreover, the half-engaged state of the main clutch 18 denotes a state where the rotational power is transmitted while causing the slipping between the pair of contact members.

The clutch actuator 19 generates fastening power by which the pair of contact members of the clutch 18 are engaged with each other. The fastening power corresponds to power by which the pair of contact members are pressed against each other. The main clutch 18 can transmit torque (also called power transmitting torque) corresponding to the fastening power. A state where the fastening power is more than zero and less than a predetermined set value may be referred to as the half-engaged state. When input torque that exceeds the power transmitting torque generated in accordance with the fastening power is transmitted from the driving source to one of the contact members, the power transmitting torque corresponding to the fastening power is transmitted from this contact member to the other contact member, and the slipping occurs between the pair of contact members in accordance with the rest of the input torque. Moreover, when input torque that is less than the power transmitting torque generated in accordance with the fastening power is transmitted from the driving source to one of the contact members, the slipping does not occur between the pair of contact members even in the half-engaged state of the clutch 18, and the input torque itself is transmitted from this contact member to the other contact member.

In the present embodiment, the clutch actuator 19 is a hydraulic actuator. To be specific, the clutch actuator 19 includes a hydraulic chamber, a piston, and a solenoid valve. The piston is driven by hydraulic pressure (hereinafter may also be referred to as "clutch pressure") of the hydraulic chamber. The solenoid valve is an electromagnetic on-off valve that adjusts the hydraulic pressure of the hydraulic chamber. The solenoid valve adjusts the opening degree of the hydraulic chamber when a supplied current value is changed, for example, a duty ratio is changed. In accordance with a change in the hydraulic pressure of the hydraulic chamber as described above, engaging pressure of the main clutch 18 changes, in other words, the fastening power by which the pair of contact members are engaged with each other changes. In the present embodiment, the power transmission rate and the fastening power increase as the clutch pressure increases. Moreover, the pair of contact members of the clutch 18 are being biased by a spring in such a direction as to separate from each other. When the fastening power which is generated by the clutch actuator 19 to bring the pair of contact members into contact with each other is smaller than the biasing force of the spring, the contact members of the clutch 18 are disengaged from each other, i.e., the clutch 18 becomes the disengaged state. Moreover, as the fastening power increases from a state where the biasing force of the spring and the fastening power are balanced, the power transmission rate at which the power is transmitted through the clutch 18 increases. In other words, the frictional force can be increased in accordance with an increase in the fastening power, and the power transmitted can be increased until the slipping between the pair of contact members occurs.

As above, the transmitting torque transmitted from the engine 12 to the input shaft 21 through the engine power transmitting path depends on the output of the engine 12 and the power transmission rate of the clutch 18. Moreover, the transmitting torque transmitted from the input shaft 21 to the engine 12 through the engine power transmitting path also depends on the output of the input shaft 21 and the power transmission rate of the clutch 18. The engine 12, the clutch 18, and the clutch actuator 19 constitute a power inputter which inputs the power to the input shaft 21 through the engine power transmitting path.

The output shaft 22 is located parallel to the input shaft 21. Hereinafter, a direction parallel to the input shaft 21 and the output shaft 22 is referred to as an "axial direction." The transmission gear pairs 23 are lined up in the axial direction. Change gear ratios of the transmission gear pairs 23 are different from each other. The change gear ratio is a ratio of the rotational frequency of the input shaft 21 to the rotational frequency of the output shaft 22. The change gear ratio is also a ratio of the number of teeth of a gear at the output shaft 22 side to the number of teeth of a gear at the input shaft 21 side, and may also be referred to as a gear ratio. Each of the transmission gear pairs 23 includes one transmission gear coaxially located at the input shaft 21 and one transmission gear coaxially located at the output shaft 22.

One of the two transmission gears of each transmission gear pair 23 is a gear (hereinafter referred to as a "corotating gear") 23a that rotates integrally with the input shaft 21 or the output shaft 22 which is coaxial with this corotating gear 23a. For example, the corotating gear 23a is splined to the input shaft 21 or the output shaft 22. The other of the two transmission gears of each transmission gear pair 23 is a gear (hereinafter referred to as an "idling gear") 23b that rotates relative to the input shaft 21 or the output shaft 22 which is coaxial with this idling gear 23b.

In each transmission gear pair 23, the corotating gear 23a and the idling gear 23b mesh with each other at all times. In the present embodiment, the corotating gears 23a and the idling gears 23b are alternately lined up on the input shaft 21 in the axial direction. Similarly, the idling gears 23b and the corotating gears 23a are alternately lined up on the output shaft 22 in the axial direction. In FIG. 2, to avoid complexity, reference signs are shown for some of the corotating gears and idling gears, and reference signs for the other gears are not shown.

The gear transmission 20 is a dog transmission. The gear transmission 20 includes: dogs 24 corresponding to gear stages; and a shift mechanism 26.

The dogs 24 are movable by the shift mechanism 26 in the axial direction relative to the input shaft 21 and the output shaft 22. The dogs 24 are moved by the shift mechanism 26 in the axial direction and are selectively engaged with one of the transmission gears of the transmission gear pairs 23. Thus, the transmission gear pair 23 including the transmission gear which has been engaged with the dogs 24 becomes such a state as to be able to transmit the driving power from the input shaft 21 to the output shaft 22. To be specific, the driving power transmitted to the input shaft 21 is transmitted to the output shaft 22 through the transmission gear pair 23 including the transmission gear which has been engaged with the dogs 24. The rotational power of the output shaft 22 is transmitted through an output transmitting member 16 to the rear wheel 3 that is the driving wheel. The output transmitting member 16 is, for example, a chain, a belt, a drive shaft, or the like.

The shift mechanism 26 includes shift forks 27a, 27b, and 27c, a spindle 28, and a shift drum 29. The shift forks 27a, 27b, and 27c are supported by the spindle 28, located parallel to the input shaft 21 and the output shaft 22, so as to be slidable. As described below, in the present embodiment, each of some of the corotating gears 23a is integrated with the dogs 24. One end portion of the shift fork 27a is connected to the corotating gear 23a which is externally attached to the input shaft 21 and moves integrally with the dogs 24. Moreover, one end portion of the shift fork 27b is connected to the corotating gear 23a which is externally attached to the output shaft 22 and moves integrally with the dogs 24, and one end portion of the shift fork 27c is connected to the corotating gear 23a which is externally attached to the output shaft 22 and moves integrally with the dogs 24.

Moreover, the other end portions of the shift forks 27a, 27b, and 27c are fitted to guide grooves G of the shift drum 29. When the shift drum 29 rotates, the shift forks 27a, 27b, and 27c guided by the guide grooves G move the corresponding dogs 24 in the axial direction. When the dogs 24 enter below-described accommodating spaces S of the idling gear 23b, the dogs 24 are engaged with the idling gear 23b with a play. Moreover, when the dogs 24 get out from the below-described accommodating spaces S of the idling gear 23b, the dogs 24 are disengaged from the idling gear 23b.

Figure 3:
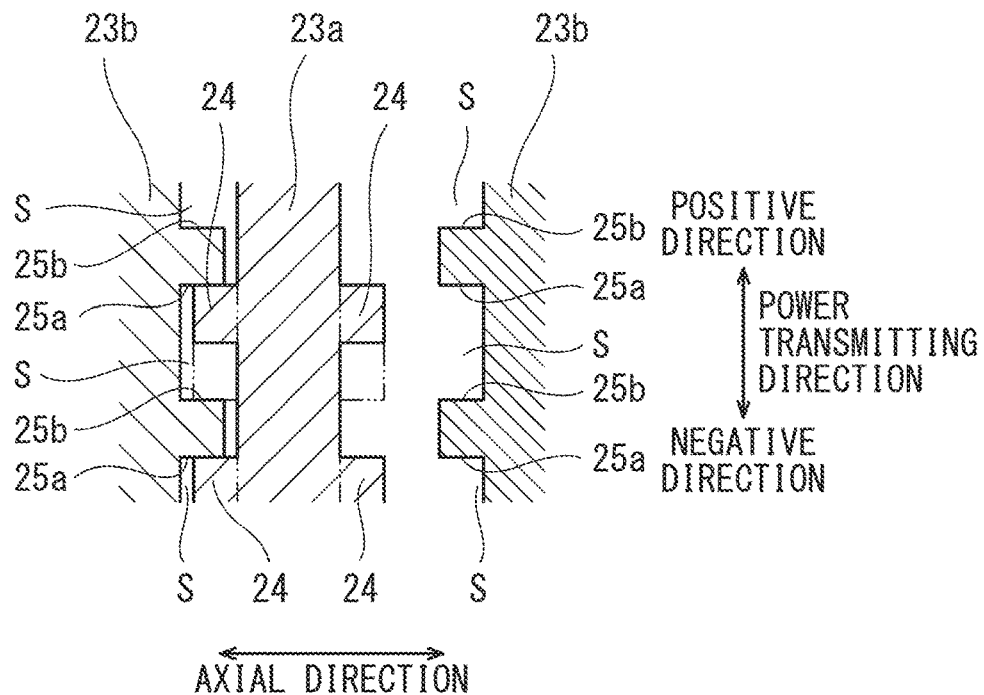
FIG. 3 is an enlarged schematic diagram showing an engaged state between a dog and a transmission gear when viewed in a direction orthogonal to an axial direction of an input shaft.

FIG. 3 is an enlarged view showing some transmission gears coaxially located at the input shaft 21 when viewed in a direction orthogonal to the axial direction. FIG. 3 shows the engaged state between the transmission gear and the dogs 24 at a certain gear stage, i.e., FIG. 3 shows a state where the dogs 24 have entered the accommodating spaces S of the transmission gear.

As shown in FIG. 3, in the present embodiment, each of some of the corotating gears 23a is integrated with the dogs 24 and is movable together with the dogs 24 in the axial direction relative to the input shaft 21 or the output shaft 22. Specifically, the dogs 24 are located so as to project in the axial direction from axial end surfaces of the corotating gear 23a. The dogs 24 include projections which are located on the end surfaces of the corotating gear 23a and are lined up in a circumferential direction of the corotating gear 23a at predetermined intervals.

The idling gear 23b opposed to the dogs 24 and the corotating gear 23a in the axial direction includes the accommodating spaces S into which the dogs 24 can enter. The accommodating spaces S are open at a side where the dogs 24 are located in the axial direction such that the dogs 24 that are moving can enter. In the present embodiment, the accommodating spaces S are holes on an axial end surface of the idling gear 23b (see FIG. 4). The accommodating spaces S may be defined by projections which are located on the axial end surface of the idling gear 23b and are lined up in a circumferential direction of the idling gear 23b at predetermined intervals. To be specific, each of the accommodating spaces S may be a space defined between the projections adjacent to each other in the circumferential direction of the idling gear 23b on the end surface of the idling gear 23b. The accommodating space S may or may not be open in the radial direction of the idling gear 23b.

Figure 4:
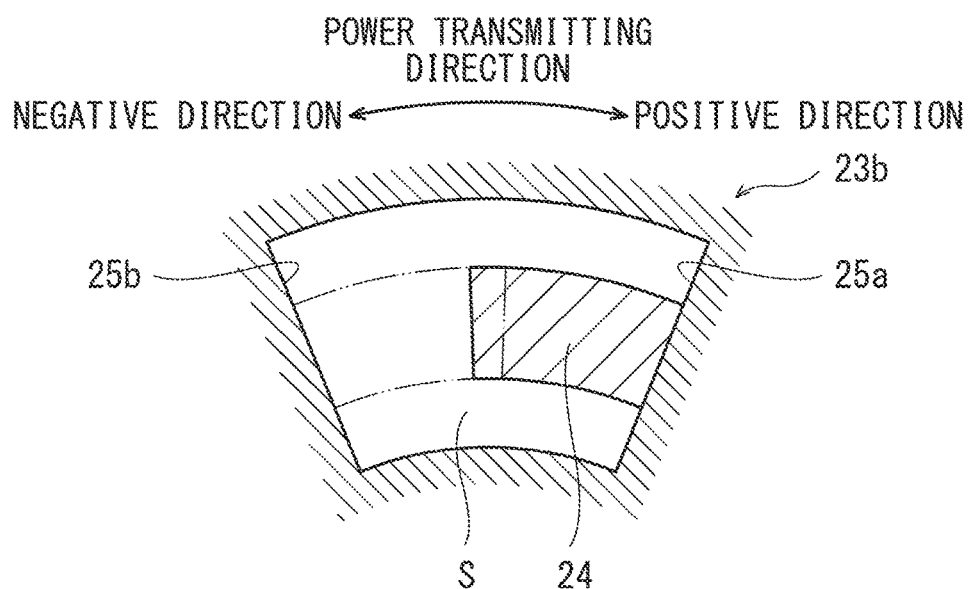
FIG. 4 is an enlarged schematic diagram showing the engaged state between the dog and the transmission gear when viewed in the axial direction of the input shaft.

FIG. 4 is an enlarged view showing that the dog 24 has entered the accommodating space S of the transmission gear, when viewed from the axial direction. The transmission gear including the accommodating spaces S includes first surfaces 25a and second surfaces 25b which are located in the circumferential direction of the transmission gear and define the accommodating spaces S. The first surface 25a and the second surface 25b face each other in a power transmitting direction, and the dog having entered the accommodating space S is movable between the first surface 25a and the second surface 25b relative to the transmission gear.

The power transmitting direction includes a positive direction and a negative direction opposite to the positive direction. The positive direction denotes a direction in which when the motorcycle 1 accelerates forward, the dog 24 that rotates integrally with the input shaft 21 moves relative to the idling gear 23b that rotates integrally with the output shaft 22. The negative direction denotes a direction in which when the motorcycle 1 decelerates, the dog 24 that rotates integrally with the input shaft 21 moves relative to the idling gear 23b that rotates integrally with the output shaft 22.

The first surface 25a is a surface with which the dog 24 having entered the accommodating space S contacts when the dog 24 transmits torque to at least the output shaft 22 in the positive direction. To be specific, the first surface 25a is a surface with which the dog 24 having entered the accommodating space S contacts when the dog 24 accelerates at least the rotation of the output shaft 22. In other words, the first surface 25a is a surface with which the dog 24 having entered the accommodating space S contacts while the vehicle (in the present embodiment, the motorcycle 1) is accelerating forward. A state where the dog 24 is in contact with the first surface 25a is referred to as a positive torque transmitting state that is a state in which the torque is transmitted from the driving source to the driving wheel. Moreover, the position of the dog 24 relative to the transmission gear when the dog 24 contacts the first surface 25a is referred to as a positive position.

The second surface 25b is a surface with which the dog 24 having entered the accommodating space S contacts when the dog 24 decelerates at least the rotation of the output shaft 22. In other words, the second surface 25b is a surface with which the dog 24 having entered the accommodating space S contacts while the vehicle (in the present embodiment, the motorcycle 1) is decelerating. A state where the dog 24 is in contact with the second surface 25b is referred to as a negative torque transmitting state that is a state in which the torque is transmitted from the driving wheel to the driving source. The position of the dog 24 relative to the transmission gear when the dog 24 contacts the second surface 25b is referred to as a negative position. Moreover, the position of the dog 24 relative to the transmission gear when the dog 24 having entered the accommodating space S does not contact either of the first surface 25a and the second surface 25b is referred to as a neutral position. Even in a case other than the acceleration of the vehicle and the deceleration of the vehicle, i.e., for example, even while the vehicle is moving at constant speed, the dog 24 may contact the first surfaces 25a or the second surfaces 25b.

For example, when the state of the motorcycle 1 changes from a decelerating state to an accelerating state, the rotational speed of the dog 24 is increased by an increase in the transmitting torque transmitted from the driving source to the input shaft 21. Then, the dog 24 moves in the positive direction relative to the gear 23b and contacts the first surface 25a of the gear 23b to become the positive torque transmitting state. Moreover, for example, when the state of the motorcycle 1 changes from the accelerating state to the decelerating state, the rotational speed of the dog 24 is decreased by a decrease in the transmitting torque transmitted to the input shaft 21. Then, the dog 24 moves in the negative direction relative to the gear 23b and contacts the second surface 25b of the gear 23b to become the negative torque transmitting state.

As above, since the dog 24 and the transmission gear 23b are engaged with each other with a play, the dog 24 collides with the transmission gear 23b (i.e., the first surface 25a or the second surfaces 25b) in the power transmitting direction in accordance with a change in the state of the motorcycle 1. In the present embodiment, collision force of the dog 24 with respect to the transmission gear 23b is reduced by below-described shock reduction processing. The dog 24 is one example of a "first transmitting structure." The transmission gear including the accommodating spaces S into which the dogs 24 enter is one example of a "second transmitting structure."

Figure 5:
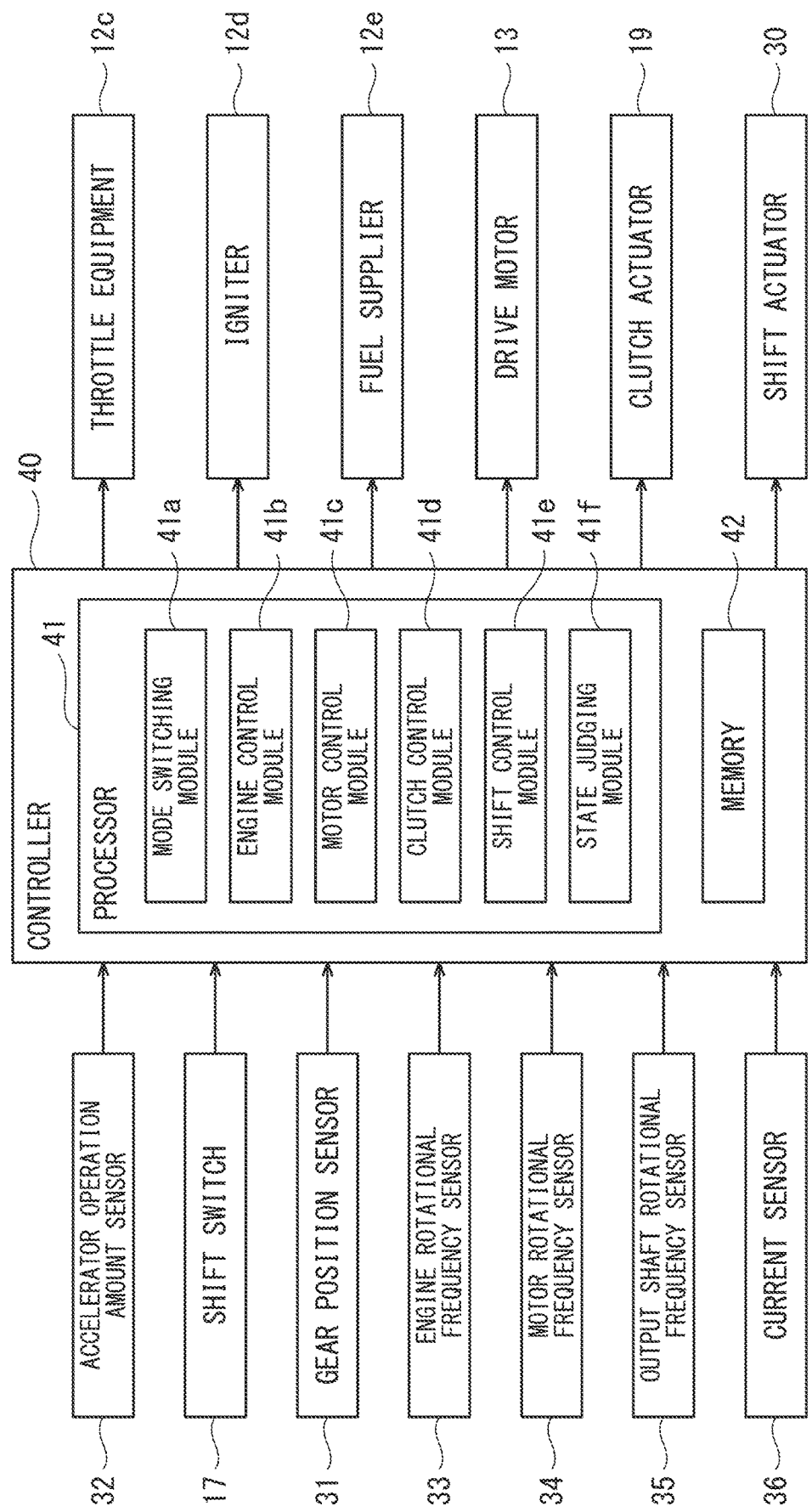
FIG. 5 is a block diagram showing the controller and its inputs and outputs.

FIG. 5 is a block diagram showing the controller 40 and its inputs and outputs. The controller 40 controls the engine 12, the drive motor 13, the clutch actuator 19, and the shift actuator 30. As shown in FIG. 5, the controller 40 receives detection signals from an accelerator operation amount sensor 32, the shift switch 17, a gear position sensor 31, an engine rotational frequency sensor 33, a motor rotational frequency sensor 34, an output shaft rotational frequency sensor 35, a current sensor 36, and the like. The controller 40 outputs control signals to throttle equipment 12c, an igniter 12d, a fuel supplier 12e, the drive motor 13, the clutch actuator 19, and the shift actuator 30.

The accelerator operation amount sensor 32 detects an accelerator operation amount (acceleration requested amount) of the rider.

The shift switch 17 sends a shift command to the controller 40 in accordance with a manual operation of the rider. The shift command is a command by which the gear stage of the gear transmission 20 is changed. For example, the shift command is a shift-up command or a shift-down command.

The gear position sensor 31 detects a rotation angle of the shift drum 29. A selected one of the transmission gear pairs 23 of the gear transmission 20, i.e., a selected one of the gear stages can be detected by the rotation angle of the shift drum 29.

The engine rotational frequency sensor 33 detects a rotational frequency (hereinafter may be referred to as an "engine rotational frequency") of an output shaft of the engine 12. The motor rotational frequency sensor 34 detects a rotational frequency (hereinafter may be referred to as a "motor rotational frequency") of an output shaft of the drive motor 13.

The output shaft rotational frequency sensor 35 detects the rotational frequency of the output shaft 22. The output shaft rotational frequency sensor 35 may be located at the output shaft 22 and directly detect the rotational frequency of the output shaft 22. Or, the output shaft rotational frequency sensor 35 may indirectly detect the rotational frequency of the output shaft 22 by detecting another parameter. For example, the output shaft rotational frequency sensor 35 may be a wheel rotational frequency sensor that detects the rotational frequency of the rear wheel 3 that is the driving wheel (see FIG. 2).

The current sensor 36 detects the value of a current flowing through a solenoid of the solenoid valve that controls the clutch pressure of the clutch actuator 19.

The throttle equipment 12c adjusts an intake air amount of the engine 12. For example, the throttle equipment 12c is electronic control throttle equipment that opens and closes a throttle valve by a motor. The igniter 12d ignites a fuel-air mixture in the combustion chamber of the engine 12. The igniter 12d is, for example, an ignition plug. The fuel supplier 12e supplies fuel to the engine 12.

The shift actuator 30 generates the power that moves the dogs 24 in the axial direction. Specifically, the shift actuator 30 is controlled by the controller 40 and rotates the shift drum 29 of the shift mechanism 26. To be specific, the shift actuator 30 is controlled by the controller 40, moves in the axial direction the dogs 24 engageable with the transmission gear pairs 23, and sets one transmission gear pair 23, which has been engaged with the dogs 24, among the transmission gear pairs 23 to a power transmitting state. The controller 40 controls the shift actuator 30 in accordance with the operation of the rider with respect to the shift switch 17. The shift actuator 30 is, for example, an electric motor.

The controller 40 includes one or more processors 41 in terms of hardware. The processor 41 includes a processing unit, a volatile memory, and a non-volatile memory. The processor 41 is one example of processing circuitry. In the processor 41, the processing unit performs calculation processing by using the volatile memory in accordance with a program stored in the non-volatile memory and outputs a control signal corresponding to the detection signals input to the controller 40. The controller 40 includes a mode switching module 41a, an engine control module 41b, a motor control module 41c, a clutch control module 41d, a shift control module 41e, and a state judging module 41f in terms of software. In FIG. 5, one or more processors 41 are shown by one block, and functional blocks 41a, 41b, 41c, 41d, 41e, and 41f are shown in the block of the processor 41. Moreover, the controller 40 includes a memory 42. The memory 42 includes the volatile memory and the non-volatile memory.

The mode switching module 41a selects one of traveling modes including an EGV mode, an EV mode, and a HEV mode.

The EGV mode is a mode in which: the drive motor 13 is not driven; the engine 12 is driven; and the rear wheel 3 that is the driving wheel is driven only by the rotational power of the engine 12. In the EGV mode, the main clutch 18 is set to the engaged state by the clutch actuator 19 such that the rotational power of the engine 12 is transmitted through the gear transmission 20 to the rear wheel 3 that is the driving wheel.

The EV mode is a mode in which: the engine 12 is stopped; and the rear wheel 3 that is the driving wheel is driven by the power generated by the drive motor 13. In the EV mode, the main clutch 18 is set to the disengaged state by the clutch actuator 19 such that the engine 12 does not become resistance during the driving of the drive motor 13.

The HEV mode is a mode in which the rear wheel 3 that is the driving wheel is driven by the power generated by the drive motor 13 and the engine 12. In the HEV mode, the main clutch 18 is basically set to the engaged state such that the rotational power of the engine 12 is transmitted to the rear wheel 3 through the gear transmission 20. However, even in the HEV mode, the power transmission rate of the clutch 18 may change depending on the situation, such as when below-described clutch control is executed.

The EGV mode may be omitted, and the HEV mode may include a state where the rear wheel 3 that is the driving wheel is driven only by the rotational power of the engine 12. To be specific, the HEV mode may be one traveling mode in which the rear wheel 3 is driven by at least the power generated by the engine 12. Moreover, the HEV mode also includes an electric power generation traveling state in which output torque of the engine 12 makes the motorcycle 1 travel while making the drive motor 13 generate electric power.

The engine control module 41*b* controls the throttle equipment 12*c*, the igniter (ignition plug) 12*d*, and the fuel supplier 12*e* to adjust the output of the engine 12. For example, the engine control module 41*b* performs torque control such that the output torque of the engine 12 becomes a value corresponding to the accelerator operation amount of the rider.

The motor control module 41*c* controls the drive motor 13 to adjust the output of the drive motor 13. For example, the motor control module 41*c* performs torque control such that the output torque of the drive motor 13 becomes a value corresponding to the accelerator operation amount of the rider. Moreover, the motor control module 41*c* switches the state of the drive motor 13 between a state where the drive motor 13 generates regenerative braking power and a state where the drive motor 13 generates the driving power that rotates the driving wheel. The engine control module 41*b* and the motor control module 41*c* perform control corresponding to the traveling mode selected by the mode switching module 41*a*.

The clutch control module 41*d* outputs to the clutch actuator 19 a clutch pressure command value (a command value of the current applied to the solenoid valve) by which the power transmission rate of the clutch 18 is changed.

In the present embodiment, the clutch actuator 19 is a hydraulic actuator. To be specific, the clutch actuator 19 changes the clutch pressure to change the power transmission rate of the power transmitted from the engine 12 to the input shaft 21. There is a predetermined correlation between the clutch pressure and the power transmission rate of the clutch 18. To be specific, the clutch pressure is a parameter indicating the power transmission rate of the clutch 18. When the clutch pressure is preset open corresponding pressure, the power transmission rate of the clutch 18 is 0%, and the clutch 18 is in the disengaged state. Then, as the clutch pressure increases from the open corresponding pressure, the power transmission rate also increases. When the clutch pressure is preset engagement corresponding pressure or not less than the engagement corresponding pressure, the power transmission rate of the clutch 18 is 100%, and the clutch 18 is in the engaged state.

Moreover, the clutch pressure has a correlation with the value of the current flowing through the solenoid that controls the clutch pressure. Therefore, in the present embodiment, from the value of the current flowing through the solenoid and detected by the current sensor 36, the clutch control module 41*d* estimates the clutch pressure corresponding to the value of this current. Then, from the estimated clutch pressure, the clutch control module 41*d* estimates the power transmission rate corresponding to the clutch pressure. The current value detected by the current sensor 36 is also a parameter indicating the power transmission rate of the clutch 18. The clutch control module 41*d* determines the clutch pressure command value based on the current value acquired from the current sensor 36.

Instead of the current sensor 36, a hydraulic pressure sensor that detects the clutch pressure may be mounted on a vehicle body of the motorcycle 1. In this case, the clutch control module 41*d* may determine the clutch pressure command value based on a value acquired from the hydraulic pressure sensor.

The clutch control module 41*d* executes the clutch control in the below-described shock reduction processing.

The shift control module 41*e* controls the shift actuator 30 in accordance with the acquired shift command.

The state judging module 41*f* determines the state of the motorcycle 1 and the states of various elements of the motorcycle 1. For example, the state judging module 41*f* determines whether or not the relative position of the dog 24, which has entered the accommodating space S of the transmission gear 23*b*, relative to the transmission gear 23*b* changes. For example, the state judging module 41*f* determines the degree of engagement of the clutch 18. For example, the state judging module 41*f* determines whether or not the state of the engine 12 is a below-described predetermined unstable state.

Shock Reduction Processing

Figure 6:
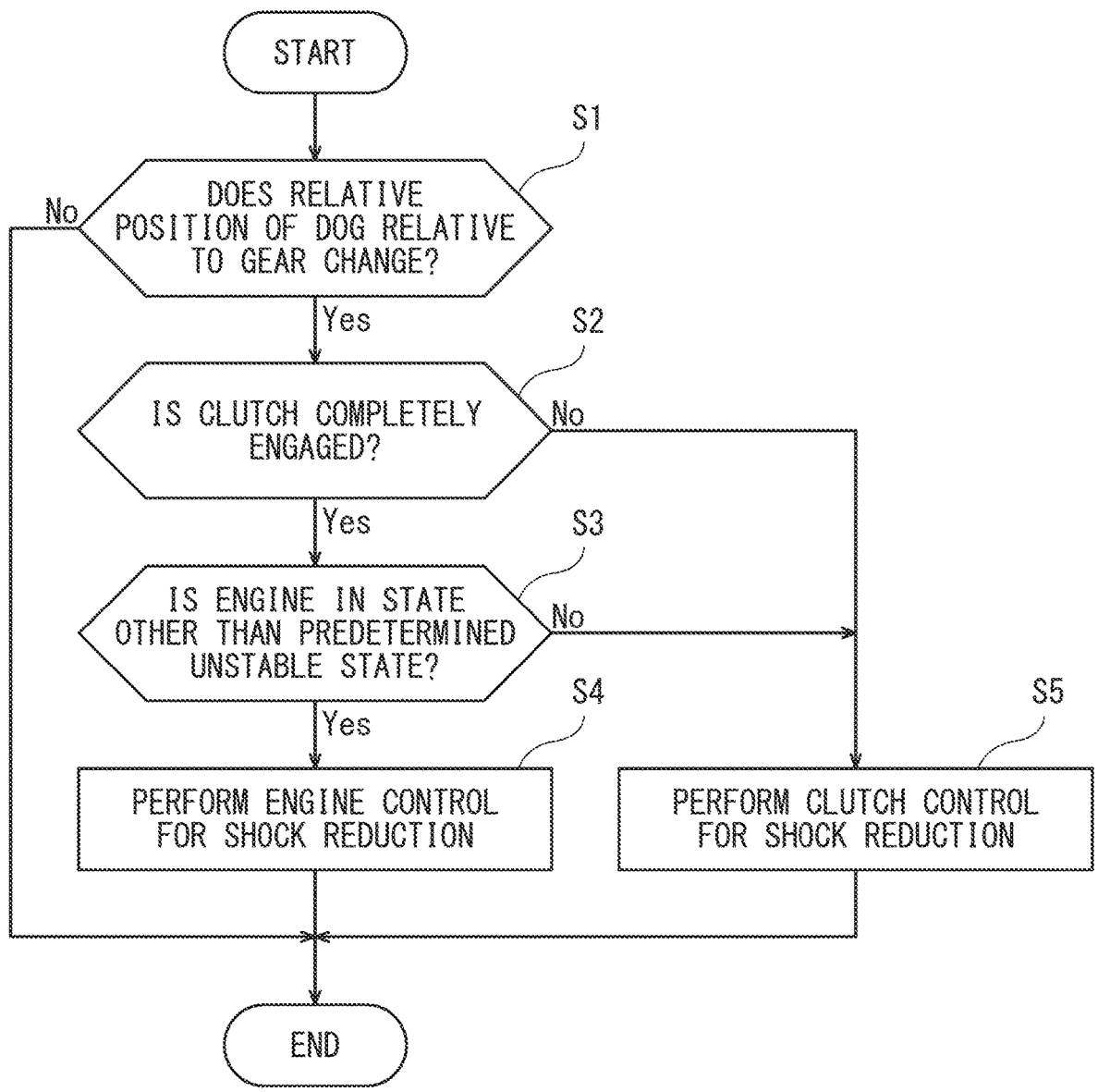
FIG. 6 is a flowchart showing the flow of shock reduction processing in Embodiment 1.

FIG. 6 is a flowchart showing the flow of the shock reduction processing of reducing shock generated by the movement of the dog 24 in the power transmitting direction in the accommodating space S of the transmission gear 23*b* in the HEV mode. The shock reduction processing is processing executed in, for example, a non-shift period in which the shift actuator 30 is not driving. In the shock reduction processing, an engine control mode and a clutch control mode are selectively executed. The engine control mode is a mode in which the shock is reduced by controlling the engine 12. The clutch control mode is a mode in which the shock is reduced by controlling the clutch actuator 19.

Specifically, the state judging module 41*f* determines whether or not the relative position of the dog 24 relative to the transmission gear 23*b* in the power transmitting direction changes (Step S1). When it is determined that the relative position of the dog 24 relative to the transmission gear 23*b* does not change (Yes in Step S1), the shock reduction processing terminates. Since the shock reduction processing is repeatedly executed in the non-shift period, whether or not the relative position changes is monitored in the non-shift period.

Whether or not the relative position of the dog 24 relative to the transmission gear 23*b* in the power transmitting direction changes may be determined before the relative position of the dog 24 relative to the transmission gear 23*b* changes. To be specific, the determination regarding whether or not the relative position of the dog 24 relative to the transmission gear 23*b* in the power transmitting direction changes includes a prediction regarding whether or not the relative position of the dog 24 relative to the transmission gear 23*b* in the power transmitting direction will change. However, whether or not the relative position of the dog 24 relative to the transmission gear 23*b* changes may be determined immediately after the relative position of the dog 24 relative to the transmission gear 23*b* has changed. In this case, the change in the relative position of the dog 24 relative to the transmission gear 23*b* may be detected or estimated from values of various sensors. The determination may be executed when the change in the relative position of the dog 24 relative to the transmission gear 23*b* terminates at the latest, i.e., before the dog 24 collides with the transmission gear 23*b*.

The state judging module 41*f* determines whether or not a judgment condition indicating that the relative position of the dog 24 relative to the transmission gear 23*b* changes is satisfied. In the present embodiment, the judgment condition includes a condition for determining a switching operation of the state of the vehicle. Specifically, for example, the judgment condition includes a condition for determining the presence or absence of each of below-described switching operations (a1), (a2), and (a3).

(a1) Switching operation from a stop state to a start accelerating state
(a2) Switching operation from the decelerating state to the accelerating state
(a3) Switching operation from the accelerating state to the decelerating state The switching operation (a1) corresponds to an operation in which the position of the dog 24 relative to the transmission gear moves from the negative position or the neutral position to the positive position. The switching operation (a2) corresponds to an operation in which the position of the dog 24 relative to the transmission gear moves from the negative position to the positive position. In other words, the switching operation (a2) corresponds to an operation in which a state where the power is transmitted from the driving wheel 3 toward the engine 12 is switched to a state where the power is transmitted from the engine 12 to the driving wheel 3. The switching operation (a3) corresponds to an operation in which the position of the dog 24 relative to the transmission gear moves from the positive position to the negative position. In other words, the switching operation (a3) corresponds to an operation in which a state where the power is transmitted from the engine 12 to the driving wheel 3 is switched to a state where the power is transmitted from the driving wheel 3 toward the engine 12.

The state judging module 41f determines based on detected values of various sensors whether or not the switching operation (a1), (a2), or (a3) occurs. For example, the state judging module 41f may determine based on the vehicle speed whether or not the switching operation (a1), (a2), or (a3) occurs.

Moreover, the state judging module 41f may determine based on a parameter other than the vehicle speed whether or not the switching operation (a1), (a2), or (a3) occurs. For example, the state judging module 41f may estimate the position of the dog 24 relative to the accommodating space S and determine based on the result of the estimation and the accelerator operation amount whether or not the switching operation (a1), (a2), or (a3) occurs. For example, when the state judging module 41f detects that an accelerator operation has been executed after a brake operation, the state judging module 41f may determine that the switching operation (a2) occurs. For example, when the state judging module 41f detects that the accelerator operation has been executed in the stop state, the state judging module 41f may determine that the switching operation (a1) occurs. For example, when the state judging module 41f detects that a shift-down operation that increases the reduction ratio has been executed without the accelerator operation and the brake operation, the state judging module 41f may determine that the switching operation (a3) occurs.

The judgment condition is not limited to the condition for determining the presence or absence of the switching operation (a1), (a2), or (a3). This is because situations that cause the change in the relative position of the dog 24 relative to the transmission gear 23b are not limited to the switching operations (a1), (a2), and (a3). For example, when the state of the vehicle switches from an inertial traveling state, which is a state where the output torque of the driving source does not contribute to the traveling of the vehicle, to the accelerating state or the decelerating state, the relative position of the dog 24 relative to the transmission gear 23b in the power transmitting direction may change. Therefore, the judgment condition may include a condition for determining the presence or absence of the switching operation from the inertial traveling state to the accelerating state or the decelerating state.

Moreover, for example, even when the vehicle keeps on traveling at constant speed, the transmitting torque necessary to make the vehicle travel at constant speed may change depending on the inclination angle of a road on which the vehicle travels, a change in the direction of the wind received by the vehicle, and the like. To be specific, even when the vehicle keeps on traveling at constant speed, the relative position of the dog 24 relative to the transmission gear 23b in the power transmitting direction may change. For example, the judgment condition may include a condition that the vehicle speed is constant, and a change in the inclination of the vehicle in the front-rear direction is not less than a predetermined value.

Moreover, for example, even when changing the gear stage, the relative position of the dog 24 relative to the transmission gear 23b in the power transmitting direction may change. For example, the judgment condition may include a condition that the operation of the rider with respect to the shift switch 17 has been executed.

As above, in cases other than the switching operations (a1), (a2), and (a3), the relative position of the dog 24 relative to the transmission gear 23b may change. The judgment condition indicating that the relative position of the dog 24 relative to the transmission gear 23b changes may be suitably set.

For example, the state judging module 41f may estimate the position of the dog 24 relative to the accommodating space S and determine based on the result of the estimation whether or not the relative position of the dog 24 relative to the transmission gear 23b changes. For example, the state judging module 41f may estimate an angular position of the dog 24 relative to the transmission gear 23b based on a torque command value with respect to the driving source and inertia of the driving source.

When it is determined that the relative position of the dog 24 relative to the transmission gear changes (Yes in Step S1), the state judging module 41f determines whether or not the clutch 18 is completely engaged, in other words, whether or not the power transmission rate of the clutch 18 is 100% (Step S2).

Whether or not the power transmission rate of the clutch 18 is 100% may be determined based on, for example, whether or not the value of the current which flows through the solenoid and is detected by the current sensor 36 corresponds to pressure that is not less than the engagement corresponding pressure. Or, whether or not the power transmission rate of the clutch 18 is 100% may be determined based on whether or not the detected value of the rotational frequency sensor that detects the rotational frequency of the input shaft 21 and a value obtained by converting the engine rotational frequency into the rotational frequency of the input shaft 21 coincide with each other.

When it is determined that the clutch 18 is completely engaged (Yes in Step S1), the state judging module 41f determines whether or not the state of the engine 12 is the predetermined unstable state (Step S3). The order of Steps S2 and S3 may be reversed. The predetermined unstable state of the engine 12 will be described later in detail.

When it is determined that the state of the engine 12 is not the predetermined unstable state (Yes in Step S3), the engine control mode for the shock reduction is selected, and control based on the engine control mode is executed (Step S4).

In the engine control mode, the engine control module 41b controls the engine 12 to change the output of the engine 12 such that the collision force of the dog 24 with respect to the transmission gear by the change in the relative position of the dog 24 relative to the transmission gear is reduced. For example, in the engine control mode, the engine control module 41b controls the engine 12 to change the output of the engine 12 such that a contact speed of the dog 24 with respect to the transmission gear or transmitting torque of the dog 24 with respect to the transmission gear is reduced. In other words, the engine control mode is a mode in which before the dog 24 collides with the transmission gear 23b, at least one of the throttle equipment 12c, the igniter 12d, and the fuel supplier 12e is controlled to adjust the output of the engine 12, and as a result, the collision force of the dog 24 with respect to the transmission gear 23b is reduced.

In the engine control, there is a situation that it is difficult or not suitable to stably adjust a speed difference between the transmission gear 23b and the dog 24. In Steps S2 and S3, whether or not there is such situation is determined. For example, in Step S2, as the situation that it is difficult or not suitable to stably adjust the speed difference between the transmission gear 23b and the dog 24, a situation that the clutch 18 is in the half-engaged state is specified. As the situation that the clutch 18 is in the half-engaged state, there are, for example, a situation that the clutch 18 is set to the half-engaged state to reduce the shock generated when the vehicle is started by the engine 12 and a situation that the clutch 18 is set to the half-engaged state to suppress the slipping during the traveling of the vehicle.

For example, the predetermined unstable state in Step S3 is a state where it is impossible or difficult to stably adjust the speed difference between the transmission gear 23b and the dog 24 by the engine 12. Examples of rotational frequency ranges of the engine include: a range where engine vibration is large; a range where responsiveness is low; a range where it is difficult to change torque output; and a range where engine stall tends to occur. Moreover, in the engine control, it is difficult to output torque of around zero. Therefore, a situation that the engine rotational frequency is in the above range and a situation that the low torque is required as the output torque of the engine 12 are disadvantageous situations for the engine control. Thus, in Step S3, whether or not the engine control is in the disadvantageous situation is determined.

The predetermined unstable state of the engine 12 may include at least one of the following states (b1), (b2), (b3), and (b4).
(b1) A state where the engine rotational frequency is in a predetermined low rotational frequency range in which the engine stall tends to occur
(b2) A state where required torque required as torque which is transmitted to the input shaft 21 to adjust the speed difference between the transmission gear 23b and the dog 24 is not more than a predetermined value
(b3) A state where a throttle opening degree is reduced
(b4) A state where the engine 12 (for example, the cylinder of the engine 12) is not adequately warm For example, when the state judging module 41f determines that the engine rotational frequency is not more than a predetermined rotational frequency, the state judging module 41f may determine that the state of the engine 12 is the state (b1). Moreover, for example, when the state judging module 41f calculates the required torque required as the torque transmitted to the input shaft 21 and determines that the calculated required torque is not more than predetermined torque, the state judging module 41f may determine that the state of the engine 12 is the state (b2). Moreover, for example, when the state judging module 41f determines that the throttle opening degree is not more than a predetermined opening degree, the state judging module 41f may determine that the state of the engine 12 is the state (b3). Moreover, for example, when the state judging module 41f determines that a detected temperature of a temperature sensor which is located at the engine 12 and detects the temperature of the engine 12 is not more than a predetermined temperature, the state judging module 41f may determine that the state of the engine 12 is the state (b4).

When it is determined that the clutch 18 is not completely engaged (No in Step S2) or when it is determined that the state of the engine 12 is the predetermined unstable state (No in Step S3), the clutch control mode for the shock reduction is selected, and control based on the clutch control mode is executed (Step S5).

In Step S2, whether or not the clutch 18 is in the half-engaged state may be determined. The state judging module 41f may determine whether or not the power transmission rate of the clutch 18 is more than 0% and less than 100%. When it is determined that the clutch 18 is in the half-engaged state, the shock reduction processing may proceed to Step S5.

In the clutch control mode, the clutch control module 41d controls the clutch actuator 19 to change the power transmission rate of the clutch 18 such that the collision force of the dog 24 with respect to the transmission gear by the change in the relative position of the dog 24 relative to the transmission gear is reduced. For example, the clutch control module 41d controls the clutch actuator 19 to change the power transmission rate of the clutch 18 such that the contact speed of the dog 24 with respect to the transmission gear or the transmitting torque of the dog 24 with respect to the transmission gear is reduced. For example, the clutch control module 41d controls the clutch actuator 19 to change the power transmission rate of the clutch 18 such that apparent inertia of a driving part that rotates together with the input shaft 21 is reduced. The clutch control mode will be described with reference to FIGS. 7 and 8.

Clutch Control

Figure 7:
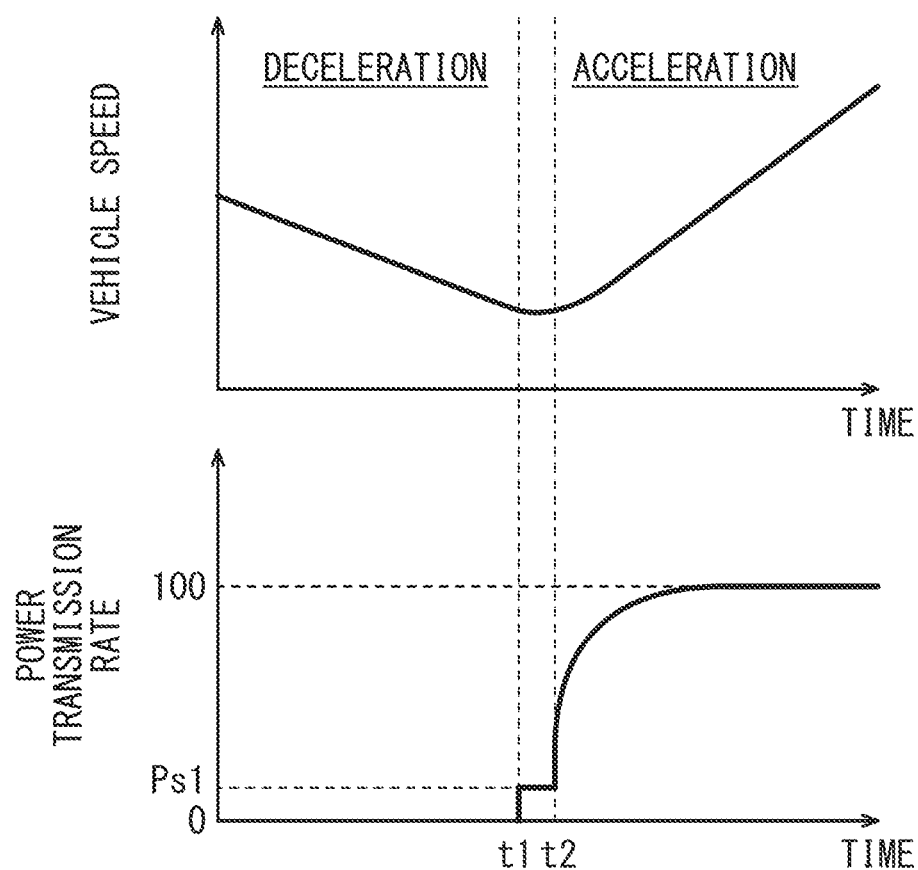
FIG. 7 is a graph showing one example of a change in a vehicle speed and a change in a power transmission rate of a clutch when the state of the vehicle changes from a decelerating state to an accelerating state.

FIG. 7 is a graph showing one example of a change in the vehicle speed and a change in the power transmission rate of the clutch 18 in a case where control in the clutch control mode is executed when the state of the vehicle 1 changes from the decelerating state to the accelerating state. When the state of the vehicle 1 changes from the decelerating state to the accelerating state, in other words, when the torque transmitting state changes from the negative torque transmitting state to the positive torque transmitting state, the relative position of the dog 24 relative to the transmission gear changes from the negative position at which the dog 24 contacts the second surface 25b to the positive position at which the dog 24 contacts the first surface 25a.

As shown in FIG. 7, in the clutch control mode, the clutch control module 41d controls the clutch actuator 19 such that the power transmission rate of the clutch 18 is maintained at not more than a set transmission rate Ps1 in a predetermined period (in FIG. 7, a period from a time point t1 to a time point t2) that is part of a period in which the relative position moves from the negative position to the positive position. In the present embodiment, the clutch control module 41d controls the clutch actuator 19 such that the power transmission rate of the clutch 18 is maintained at the set transmission rate Ps1 in the predetermined period. After the predetermined period, the clutch control module 41d controls the clutch actuator 19 such that the power transmission rate of the clutch 18 is increased from the set transmission rate Ps1 to 100%.

FIG. 7 shows that the power transmission rate is 0% while the vehicle is decelerating. However, the power transmission rate may be 100% while the vehicle is decelerating.

Figure 8:
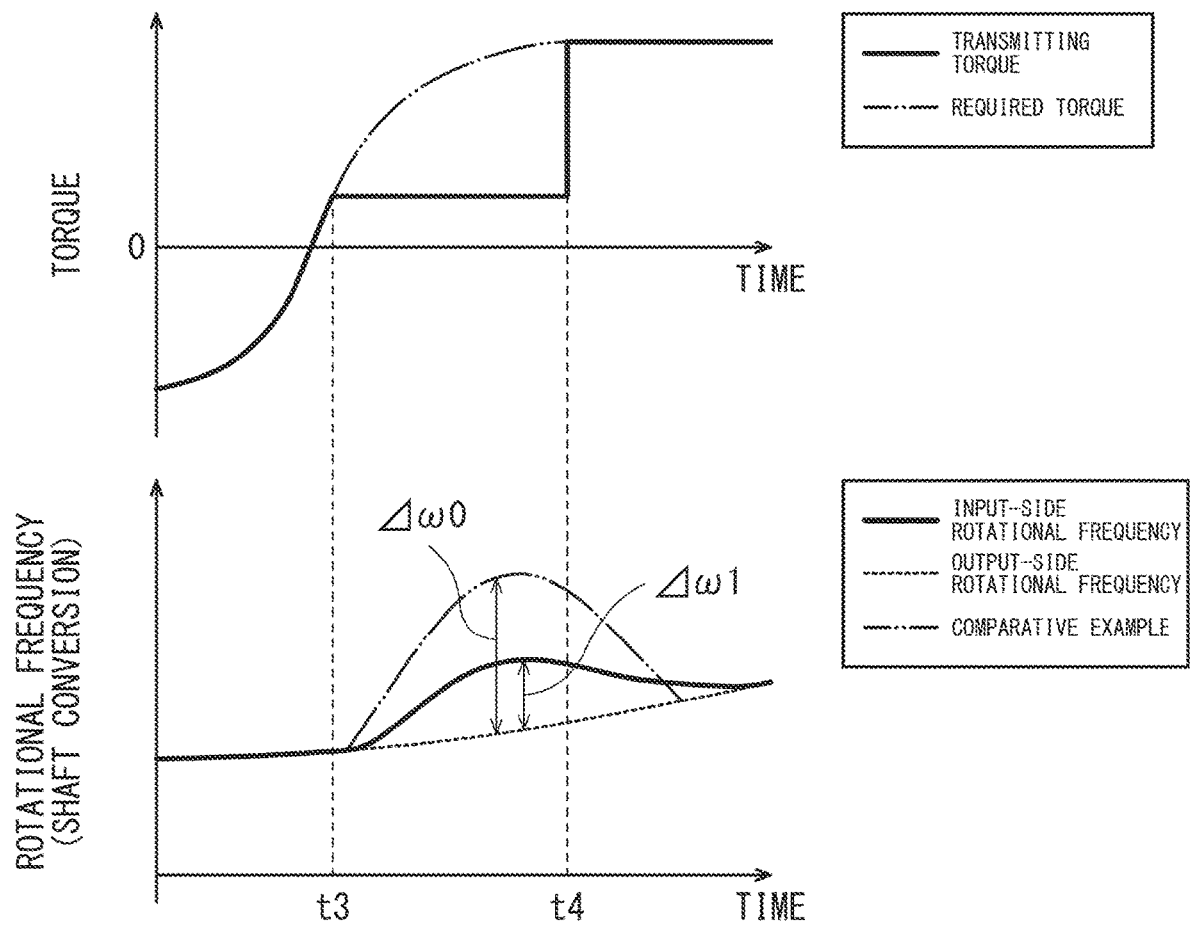
FIG. 8 is a graph for explaining a shock reduction effect obtained by executing clutch control.

FIG. 8 is a graph for explaining an effect of reducing the shock in the clutch control mode. FIG. 8 shows changes in various values in a case where control in the clutch control mode is executed when the state of the vehicle 1 changes from the decelerating state to the accelerating state.

In an upper graph of FIG. 8, the transmitting torque transmitted from the clutch 18 to the input shaft 21 is shown by a solid line, and the required torque required as the torque transmitted from the clutch 18 to the input shaft 21 is shown by a two-dot chain line. The required torque is a value corresponding to the accelerator operation amount.

In a lower graph of FIG. 8, rotational speeds of the dog 24 and the transmission gear 23b which are engaged with each other with a play are shown. The rotational speed of a component (for example, the dog 24) which is one of the dog 24 and the transmission gear 23b and rotates integrally with the input shaft 21 is shown by a solid line as an input-side rotational frequency, and the rotational speed of a component (for example, the gear 23b) which is the other of the dog 24 and the transmission gear 23b and rotates integrally with the output shaft 22 is shown by a broken line as an output-side rotational frequency. The input-side rotational frequency when the shock reduction in the clutch control mode is not executed, i.e., when the power transmission rate of the clutch 18 is 100% is shown by a two-dot chain line as Comparative Example.

As shown in the upper graph of FIG. 8, as the accelerator operation amount increases, the required torque increases, and as a result, the output of the engine 12 increases. As a result, the transmitting torque increases together with the required torque until a time point t3.

From the time point t3, the transmitting torque is maintained at minute torque. This torque is torque corresponding to the set transmission rate Ps1. To be specific, since the clutch 18 slips, only a part of the output torque of the engine 12 is transmitted to the input shaft 21 through the clutch 18. Therefore, as shown in the lower graph of FIG. 8, as compared to Comparative Example in which the entire output torque of the engine 12 is transmitted to the input shaft 21, the difference between the input-side rotational frequency and the output-side rotational frequency is suppressed. As a result, a difference Δω1 between the rotational frequency of the dog 24 and the rotational frequency of the transmission gear 23b in a case where the dog 24 and the transmission gear 23b contact each other when the clutch control is executed is smaller than a difference 400 between the rotational frequency of the dog 24 and the rotational frequency of the transmission gear 23b in a case where the dog 24 and the transmission gear 23b contact each other when the clutch control is not executed in Comparative Example. Therefore, the shock generated by the movement of the dog 24 in the accommodating space S of the transmission gear 23b can be reduced.

In FIG. 8, when the period in which the power transmission rate is maintained at the set transmission rate Ps1 terminates, and then, the power transmission rate is increased to 100%, the torque increases at a time point t4. Moreover, a timing at which the dog 24 and the transmission gear 23b contact each other depends on the difference between the input-side rotational frequency and the output-side rotational frequency and a distance from the first surface 25a to the second surface 25b (i.e., the range of the play). The timing at which the dog 24 and the transmission gear 23b contact each other may be before or after the time point t4 at which the torque increases. However, it is desirable that this contact timing be before the time point t4 at which the torque increases. Moreover, in FIG. 8, when the dog 24 and the transmission gear 23b collide with each other, the input-side rotational frequency may change. However, for ease of explanation, in FIG. 8, a change in the input-side rotational frequency by the collision of the dog 24 with the transmission gear 23b is omitted.

Not only when the state of the vehicle 1 changes from the decelerating state to the accelerating state but also when the state of the vehicle 1 changes from the stop state to the start accelerating state, the same clutch control is executed. To be specific, when the clutch control mode of Step S5 is selected, the clutch control module 41d controls the clutch actuator 19 such that the power transmission rate of the clutch 18 is maintained at the set transmission rate Ps1 in at least a part of the period in which the relative position moves to the positive position, and then, the clutch control module 41d controls the clutch actuator 19 such that the power transmission rate of the clutch 18 is increased from the set transmission rate Ps1 to 100%. The set transmission rate Ps1 may be different between when the state of the vehicle 1 changes from the decelerating state to the accelerating state and when the state of the vehicle 1 changes from the stop state to the start accelerating state.

Operational Advantages

As described above, according to the present embodiment, when the relative position of the dog 24 relative to the transmission gear changes, the power transmission rate of the clutch 18 is changed. Thus, the power transmitted from the driving source to the dog 24 is adjusted, and as a result, the speed difference between the transmission gear and the dog 24 can be reduced. When the relative position of the dog 24 relative to the transmission gear changes, the power transmission rate of the clutch 18 is changed such that the contact speed of the dog 24 with respect to the transmission gear or the transmitting torque of the dog 24 with respect to the transmission gear is reduced. To be specific, the power transmitted from the driving source to the input shaft 21 is adjusted by changing the power transmission rate of the clutch 18. By such control, the collision force generated since the transmission gear and the dog 24 which are engaged with each other move relative to each other within the range of the play can be reduced without depending on a change in the output of the driving source.

Moreover, since the collision force is reduced by the clutch 18, i.e., by a method different from the change in the output of the driving source, the number of situations that the shock reduction is realized can be increased. For example, the shock reduction is realized even in a situation that it is difficult to realize the shock reduction by the change in the output of the driving source.

Moreover, in the present embodiment, since there are two control modes that are the clutch control mode and the engine control mode, the control mode suitable for the situation can be selected. For example, in the engine control, the clutch control mode can be selected in a situation which is not suitable for the adjustment of the speed difference between the transmission gear 23b and the dog 24. For example, even in the range where the engine 12 stalls by the shock reduction realized by the engine control, the shock reduction control by using the clutch 18 can be realized. Thus, the shock felt by the rider can be prevented in a wide range of situations.

For example, when the clutch 18 is in the half-engaged state, it is difficult to adjust the speed difference between the transmission gear and the dog 24 by the change in the output of the engine 12. However, in this situation, the clutch control mode can be selected.

For example, it is difficult to adjust the output of the minute torque of around zero by the engine 12. Moreover, according to the internal combustion engine, depending on the rotational frequency range, it is difficult to change the output torque, or the engine stall tends to occur. However, in this situation, the clutch control mode can be selected.

Embodiment 2

Next, the shock reduction processing of the controller 40 according to Embodiment 2 will be described with reference to FIGS. 9 and 10. In Embodiment 2, the repetition of the same explanation as Embodiment 1 is avoided. Since the structure of the motorcycle 1 in Embodiment 2 is the same as that in Embodiment 1, an explanation thereof is omitted. In the present embodiment, when it is determined that the relative position of the dog 24 relative to the transmission gear changes, the controller 40 controls not only the clutch actuator 19 but also the drive motor 13 such that the collision force of the dog 24 with respect to the transmission gear is reduced.

Figure 9:
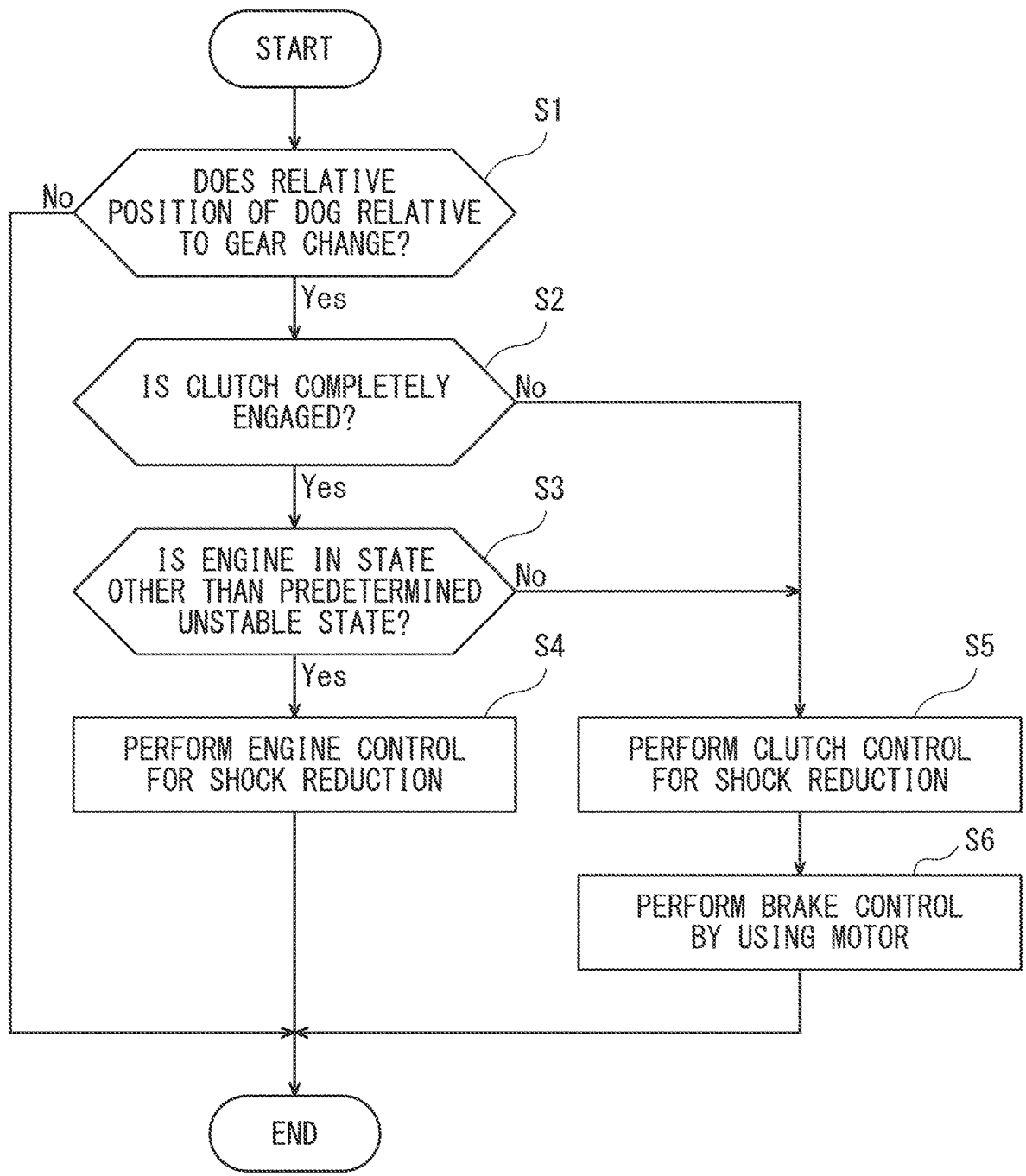
FIG. 9 is a flowchart showing the flow of the shock reduction processing in Embodiment 2.

FIG. 9 is a flowchart showing the flow of the shock reduction processing in Embodiment 2. Since Steps S1, S2, S3, S4, and S5 in the shock reduction processing of FIG. 9 are the same as those in Embodiment 1, explanations thereof are omitted. In the present embodiment, after the clutch control of Step S5 is started, the brake control by using the drive motor 13 is executed (Step S6). The brake control is control in which the speed difference between the transmission gear and the dog 24 is reduced by the drive motor 13.

Figure 10:
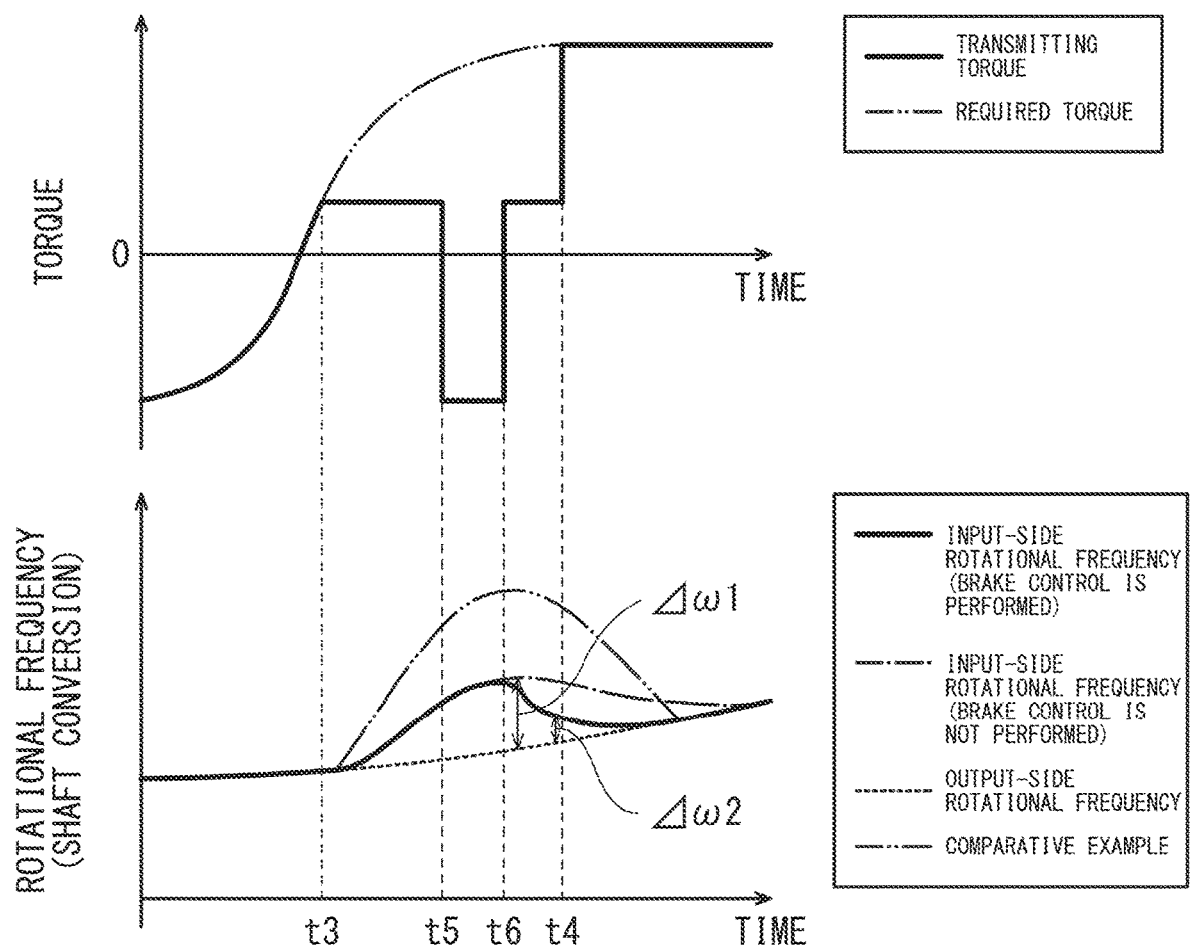
FIG. 10 is a graph for explaining the shock reduction effect obtained by executing both of the clutch control and brake control.

FIG. 10 is a graph for explaining the shock reduction effect obtained by executing both of the clutch control and the brake control. In an upper graph of FIG. 10, as with FIG. 8, the transmitting torque transmitted to the input shaft 21 is shown by a solid line, and the required torque is shown by a two-dot chain line. However, unlike FIG. 8, the transmitting torque in the upper graph of FIG. 10 is the transmitting torque when the brake control is performed, i.e., the transmitting torque in the upper graph of FIG. 10 is the total of the torque transmitted from the clutch 18 to the input shaft 21 and the torque transmitted from the drive motor 13 to the input shaft 21.

In a lower graph of FIG. 10, the rotational speeds of the dog 24 and the transmission gear 23b which are engaged with each other with a play are shown. The input-side rotational frequency when the brake control is executed is shown by a solid line, and the input-side rotational frequency when the brake control is not executed is shown by a one-dot chain line. Moreover, as with FIG. 8, the output-side rotational frequency is shown by a broken line, and Comparative Example in which the clutch control and the brake control are not executed is shown by a two-dot chain line.

As shown in the upper graph of FIG. 10, as the accelerator operation amount increases, the required torque increases, and as a result, the output of the engine 12 also increases. As a result, the transmitting torque increases together with the required torque until the time point t3.

From the time point t3, the torque transmitted from the engine 12 to the input shaft 21 through the clutch 18 is maintained at the minute torque by the clutch control. After that, the brake control is started at a time point t5 that is a time point after a set time has elapsed from a start time point of the clutch control. The set time is suitably set such that the shock reduction effect is obtained. For example, the set time is set such that the brake control starts before the transmission gear and the dog 24 collide with each other.

The start timing of the brake control is not limited to the time point after the set time has elapsed from the start time point of the clutch control. The state judging module 41f may estimate the position of the dog 24 relative to the transmission gear 23b and determine the start timing of the brake control by using the result of the estimation. For example, the set time does not have to be a fixed value and may be a variable corresponding to a certain parameter, such as the difference between the input-side rotational frequency and the output-side rotational frequency.

In a period from the time point t5 to a time point t6, torque in the negative direction, i.e., torque in such a direction as to reduce the rotational frequency of the input shaft 21 is transmitted from the drive motor 13 to the input shaft 21 by the brake control. As a result, as shown in the lower graph of FIG. 10, the difference between the input-side rotational frequency and the output-side rotational frequency can be made smaller than that when the brake control is not performed. As a result, a difference $\Delta\omega2$ between the rotational frequency of the dog 24 and the rotational frequency of the transmission gear 23b in a case where the dog 24 and the transmission gear 23b contact each other when both of the clutch control and the brake control are executed is smaller than the difference $\Delta\omega1$ between the rotational frequency of the dog 24 and the rotational frequency of the transmission gear 23b in a case where the dog 24 and the transmission gear 23b contact each other when only the clutch control is executed. This leads to the reduction in the shock generated by the movement of the dog 24 in the accommodating space S of the transmission gear 23b.

Therefore, according to the present embodiment, the effect of reducing the collision force of one of the transmitting structures with respect to the other can be further improved by changing the power of the drive motor 13 by the brake control in addition to the changing of the power transmission rate of the clutch 18 by the clutch control.

OTHER EMBODIMENTS

The present disclosure is not limited to the above embodiments, and modifications, additions, and eliminations may be made with respect to the configurations of the embodiments.

For example, in the above embodiments, the dogs 24 are integrated with the corotating gear 23a. However, the dogs 24 may be separated from the corotating gear 23a. For example, instead of locating the corotating gear 23a that is slidable relative to the input shaft 21 or the output shaft 22, a dog ring including the dogs 24 may be located so as to be slidable relative to the input shaft 21 or the output shaft 22. Moreover, the dogs do not have to be located around both of the input shaft 21 and the output shaft 22, and the dogs of all the gear stages may be located at a rotating body (a gear, a dog ring, etc.) supported by only one of the input shaft 21 and the output shaft 22.

Moreover, in the above embodiments, the dogs are moved by the shift actuator. However, transmitting structures moved by the shift actuator are not limited to these. For example, the dogs may be fixed to the transmission gear, and a member including engagement holes (or accommodating spaces) with which the dogs are engaged may be moved by the shift actuator. To be specific, to set the transmission gear pair to the power transmitting state, the engaging structures that are engaged with the transmission gear pair may be the dogs or may be structures (for example, the engagement holes) with which the dogs are engaged. Moreover, the shape of the engaging structure is not especially limited, i.e., the shape of the dog and the shape of the engagement hole with which the dog is engaged are not especially limited.

The above embodiments have described that the dog 24 is one example of the "first transmitting structure," and the transmission gear including the accommodating spaces S into which the dogs 24 enter is one example of the "second transmitting structure." However, the first transmitting structure and the second transmitting structure are not limited to these. For example, the first transmitting structure may be the transmission gear, and the second transmitting structure may be the dog that is engaged with the transmission gear. The first transmitting structure and the second transmitting structure may be power transmitting parts other than the transmission gear and the dog, and may be, for example, a pair of gears located with a play.

The play does not have to be a play of the dog in the accommodating space. For example, one or more power transmitting elements may be located between the first transmitting structure and the second transmitting structure, and the play between the first transmitting structure and the second transmitting structure may be a cumulative play on a power transmitting path extending from the first transmitting structure to the second transmitting structure.

In the above embodiments, the engine control of Step S4 and the clutch control of Step S5 are selectively executed. However, control using both of the engine control and the clutch control may be executed. To be specific, the shock reduction may be realized by changing the output of the driving source and changing the power transmission rate of the clutch 18.

Moreover, the above embodiments have described examples in which the first driving source is the internal combustion engine, and the second driving source is the electric motor. However, the types of the driving sources that transmit the driving power to the input shaft are not limited to these. Examples of the driving source include an internal combustion engine, an external combustion engine, an electric motor, and fluid machinery. The type of the engine is not especially limited. For example, the engine may be a reciprocating engine or a rotary engine. For example, the engine may be a gasoline engine or a diesel engine. For example, the engine may be a two-stroke engine or a four-stroke engine. The first driving source and the second driving source may be prime movers of the same type.

Moreover, in the above embodiments, the vehicle is a hybrid vehicle including a first driving source and a second driving source. However, the vehicle does not have to be the hybrid vehicle. For example, the vehicle may include only one of the engine and the electric motor as a driving source located upstream of the clutch. To be specific, the vehicle may be an engine vehicle including only an internal combustion engine as the traveling driving source or may be an electric vehicle including only an electric motor as the traveling driving source. When the vehicle is the electric vehicle including only the electric motor as the traveling driving source, the clutch is located on a power transmitting path extending from the electric motor as the driving source to the driving wheel and between the electric motor and the first transmitting structure (for example, the input shaft of the transmission). In other words, the electric motor may be located on the power transmitting path and upstream of the clutch.

In the control of the vehicle in which the electric motor is located on the power transmitting path and upstream of the clutch, the above-described clutch control for the shock reduction is especially effective. This is because in the control of the electric vehicle including only the electric motor and the control of non-engine traveling of the hybrid vehicle, vibration of the internal combustion engine does not occur, and therefore, the rider tends to feel the shock generated by the power switching more than in the control of the engine traveling. However, even in the vehicle in which the electric motor is located on the power transmitting path and upstream of the clutch, the shock felt by the rider and generated by the relative movements of the first transmitting structure and the second transmitting structure, which are engaged with each other, within the range of the play can be suitably reduced by executing the above-described clutch control for the shock reduction.

Moreover, the above-described clutch control for the shock reduction is suitably used in a power transmitting mechanism including a play mechanism in which one of the first transmitting structure and the second transmitting structure idles (i.e., rotates) relative to the other by a predetermined angle when the power transmitting state between the first transmitting structure and the second transmitting structure switches, such as when the torque transmitting state switches from one of the negative torque transmitting state and the positive torque transmitting state to the other.

The vehicle is not limited to the motorcycle. For example, the vehicle may be an automatic three-wheeled vehicle or an automatic four-wheeled vehicle. The above embodiments have described the controller 40 for the power system of the motorcycle 1. However, the controller is applicable to power systems of different types of vehicles, such as the automatic three-wheeled vehicle and the automatic four-wheeled vehicle.

As a correlation between the clutch pressure and the power transmission rate of the clutch 18, the above embodiments have described that the power transmission rate increases as the clutch pressure increases from the open corresponding pressure. However, the power transmission rate may increase as the clutch pressure decreases from the open corresponding pressure. To be specific, the clutch actuator may operate the clutch in such a direction that the pair of contact members are separated from each other by the increase in the clutch pressure against the biasing force of the spring which brings the contact members into contact with each other.

The above embodiments have described that the clutch actuator is the hydraulic actuator. However, the clutch actuator is not limited to this. For example, the clutch actuator may be an electric motor. In this case, it is preferable to use a solenoid actuator having excellent responsiveness to commands. Moreover, as a sensor that detects a parameter corresponding to the power transmission rate of the clutch, a displacement sensor that detects the displacement of one of a driving member and a driven member relative to the other may be used instead of using the hydraulic pressure sensor or the current sensor 36.

Moreover, in the above embodiments, the vehicle may have such a structure that both of the clutch operation performed by the rider and the clutch operation performed by the clutch actuator can be used. In other words, the vehicle may include not only the clutch actuator but also a mechanism that operates the clutch in mechanical association with the operation of the rider.

Moreover, the above embodiments have described the clutch control performed when the state of the vehicle changes from the decelerating state to the accelerating state. However, the clutch control performed when the state of the vehicle changes from the accelerating state to the decelerating state is also the same control.

Figure 11:
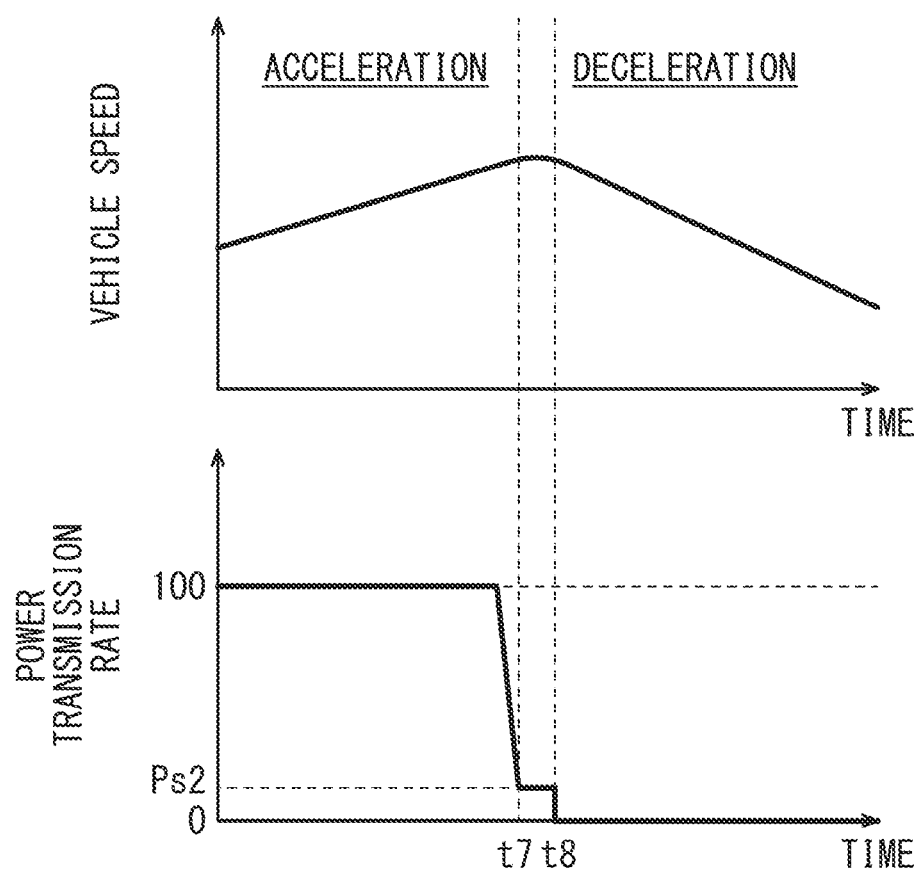
FIG. 11 is a graph showing one example of the change in the vehicle speed and the change in the power transmission rate of the clutch when the state of the vehicle changes from the accelerating state to the decelerating state.

FIG. 11 is a graph showing one example of a change in the vehicle speed and a change in the power transmission rate of the clutch when the state of the vehicle 1 changes from the accelerating state to the decelerating state. The power transmission rate is 100% until a time point t7, i.e., while the vehicle 1 is in the accelerating state. In the clutch control mode, the clutch control module 41d controls the clutch actuator 19 such that the power transmission rate of the clutch 18 is maintained at not more than a set transmission rate Ps2 in a predetermined period (in FIG. 11, a period from the time point t7 to a time point t8) that is part of a period in which the relative position moves from the positive position to the negative position. In the present embodiment, the clutch control module 41d controls the clutch actuator 19 such that the power transmission rate of the clutch 18 is maintained at the set transmission rate Ps2 in the predetermined period. After the predetermined period, the clutch control module 41d controls the clutch actuator 19 such that the power transmission rate of the clutch 18 is reduced from the set transmission rate Ps2 to 0%.

As above, when the state of the vehicle 1 changes from the accelerating state to the decelerating state, the power transmission rate of the clutch 18 is reduced from 100% to not more than the set transmission rate Ps2. To be specific, the clutch 18 slips, and the apparent inertia of the driving part that rotates together with the input shaft 21 decreases. Therefore, the collision force generated when the dog 24 collides with the transmission gear is reduced.

The set transmission rate Ps2 in the clutch control performed when the state of the vehicle 1 changes from the accelerating state to the decelerating state may be different from the set transmission rate Ps1 in the clutch control performed when the state of the vehicle 1 changes from the decelerating state to the accelerating state. For example, the set transmission rate Ps2 may be larger than the set transmission rate Ps1 or may be smaller than the set transmission rate Ps1.

The determination regarding whether or not the relative position of the first transmitting structure relative to the second transmitting structure changes may include: the determination regarding whether or not the state of the vehicle changes from the stop state to the accelerating state; the determination regarding whether or not the state of the vehicle changes from the decelerating state to the accelerating state; or the determination regarding whether or not the state of the vehicle changes from the accelerating state to the decelerating state.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

DISCLOSED ASPECTS

The following aspects disclose preferred embodiments.

First Aspect

A controller of a vehicle,
the vehicle including:
a driving source that generates power;
a driving wheel;
a first transmitting structure located on a power transmitting path through which the power is transmitted between the driving source and the driving wheel;
a second transmitting structure which is located on the power transmitting path and between the first transmitting structure and the driving wheel, is connected to the first transmitting structure so as to be movable relative to the first transmitting structure in a power transmitting direction within a range of a play, and contacts the first transmitting structure in the power transmitting direction to receive the power from the first transmitting structure;
a clutch which is located on the power transmitting path and between the driving source and the first transmitting structure and changes a power transmission rate of the power transmitted from the driving source to the first transmitting structure; and
a clutch actuator that operates the clutch,
the controller including
processing circuitry configured to
determine whether or not a relative position of the first transmitting structure relative to the second transmitting structure changes, and
when it is determined that the relative position changes, control the clutch actuator to change the power transmission rate such that collision force of one of the first transmitting structure and the second transmitting structure with respect to the other by the change in the relative position is reduced.

For example, when it is determined that the relative position changes, the processing circuitry controls the clutch actuator to change the power transmission rate of the clutch such that the contact speed of the first transmitting structure with respect to the second transmitting structure or the transmitting torque of the first transmitting structure with respect to the second transmitting structure is reduced.

According to the above configuration, when the relative position of the first transmitting structure relative to the second transmitting structure changes, the processing circuitry changes the power transmission rate of the clutch such that the collision force of one of the first transmitting structure and the second transmitting structure with respect to the other by the change in the relative position is reduced. To be specific, the power transmitted from the driving source to the first transmitting structure is adjusted by changing the power transmission rate of the clutch. By controlling the clutch as above, the collision force of one of the transmitting structures with respect to the other can be reduced without depending on the change in the output of the driving source. Moreover, since the collision force is reduced by the clutch, i.e., by a method different from the change in the output of the driving source, the number of situations that the shock reduction is realized can be increased.

Second Aspect

The controller according to the first aspect, wherein when it is determined that the relative position changes, the processing circuitry selectively executes
a clutch control mode in which the processing circuitry controls the clutch actuator to change the power transmission rate such that the collision force of one of the first transmitting structure and the second transmitting structure with respect to the other by the change in the relative position is reduced and
a driving source control mode in which the processing circuitry controls the driving source to change an output of the driving source such that the collision force of one of the first transmitting structure and the second transmitting structure with respect to the other by the change in the relative position is reduced.

According to the above configuration, since there are two control modes that reduce the speed difference between the first transmitting structure and the second transmitting structure, the control mode suitable for the situation can be selected.

Third Aspect

The controller according to the second aspect, wherein when it is determined that the relative position changes, and it is also determined that the power transmission rate is less than 100%, the processing circuitry selects the clutch control mode.

According to the above configuration, when the clutch is not in the engaged state, such as when the clutch is in the half-engaged state, it is difficult to adjust the speed difference between the first transmitting structure and the second transmitting structure by the control of the output of the driving source. Even in such situation, the speed difference between the first transmitting structure and the second transmitting structure can be reduced by the clutch control.

Fourth Aspect

The controller according to the second or third aspect, wherein:
the driving source is an internal combustion engine; and
when it is determined that the relative position changes, and it is also determined that a state of the internal combustion engine is a predetermined unstable state, the processing circuitry selects the clutch control mode.

For example, it is difficult to adjust the output of the minute torque of around zero by the internal combustion engine. Moreover, according to the internal combustion engine, depending on the rotational frequency range, it is difficult to change the output torque, or the engine stall tends to occur. According to the above configuration, when the internal combustion engine is in the predetermined unstable state that is not suitable for the adjustment of the speed difference between the first transmitting structure and the second transmitting structure, the speed difference between the first transmitting structure and the second transmitting structure can be reduced by the clutch control.

Fifth Aspect

The controller according to any one of the first to fourth aspects, wherein:

the processing circuitry determines whether or not the relative position changes from a negative position to a positive position, by determining whether or not first switching occurs, the first switching being switching from a negative torque transmitting state to a positive torque transmitting state, the negative torque transmitting state being a state where torque is transmitted from the driving wheel to the driving source, the positive torque transmitting state being a state where the torque is transmitted from the driving source to the driving wheel; and
when it is determined that the first switching occurs, the processing circuitry controls the clutch actuator such that the power transmission rate is maintained at not more than a set transmission rate in at least a part of a period in which the relative position moves from the negative position to the positive position.

In a process in which the relative position changes from the negative position to the positive position, the state of the first transmitting structure changes from a state where there is no speed difference between the first transmitting structure and the second transmitting structure through a state where the speed difference is large to the state where there is no speed difference again. According to the above configuration, the power transmission rate is maintained at not more than the set transmission rate in at least a part of the period in which the relative position moves from the negative position to the positive position. Therefore, the speed difference between the first transmitting structure and the second transmitting structure is reduced, and the impact speed of one of the transmitting structures to the other can be reduced. Thus, the shock generated by the switching of the direction in which the power is transmitted can be reduced.

Sixth Aspect

The controller according to any one of the first to fifth aspects, wherein:
the processing circuitry determines whether or not the relative position changes from a positive position to a negative position, by determining whether or not second switching occurs, the second switching being switching from a positive torque transmitting state to a negative torque transmitting state, the positive torque transmitting state being a state where torque is transmitted from the driving source to the driving wheel, the negative torque transmitting state being a state where the torque is transmitted from the driving wheel to the driving source; and
when it is determined that the second switching occurs, the processing circuitry controls the clutch actuator such that the power transmission rate is maintained at not more than a set transmission rate in at least a part of a period in which the relative position moves from the positive position to the negative position.

In a process in which the relative position changes from the positive position to the negative position, the state of the first transmitting structure changes from a state where there is no speed difference between the first transmitting structure and the second transmitting structure through a state where the speed difference is large to the state where there is no speed difference again. According to the above configuration, the power transmission rate is maintained at not more than the set transmission rate in at least a part of the period in which the relative position moves from the positive position to the negative position. Therefore, the speed difference between the first transmitting structure and the second transmitting structure is reduced, and the impact speed of one of the transmitting structures to the other can be reduced. Thus, the shock generated by the switching of the direction in which the power is transmitted can be reduced.

Seventh Aspect

The controller according to any one of the first to fifth aspects, wherein:
the vehicle further includes a sub power source that generates power to be transmitted to the first transmitting structure without through the clutch; and
when it is determined that the relative position changes, the processing circuitry controls the sub power source to generate the power such that a speed difference between the first transmitting structure and the second transmitting structure is reduced.

According to the above configuration, the power transmission rate of the clutch is changed, and in addition, the power of the sub power source is also changed. Therefore, the effect of reducing the collision force of one of the transmitting structures with respect to the other can be further improved.

Eighth Aspect

The controller according to any one of the first to seventh aspects, wherein:
the sub power source is an electric motor; and
the processing circuitry switches the electric motor between a state where the electric motor generates regenerative braking power and a state where the electric motor generates driving power that rotates the driving wheel.

According to the above configuration, the difference between the rotational frequencies of the transmitting structures is easily reduced depending on the situation.

Ninth Aspect

A method of controlling a vehicle,
the vehicle including:
a driving source that generates power;
a driving wheel;
a first transmitting structure located on a power transmitting path through which the power is transmitted between the driving source and the driving wheel;
a second transmitting structure which is located on the power transmitting path and is connected to the first transmitting structure so as to be movable relative to the first transmitting structure within a range of a play; and
a clutch which is located on the power transmitting path and between the driving source and the first transmitting structure and changes a power transmission rate of the power transmitted from the driving source to the first transmitting structure,
the method including:
determining whether or not a power transmitting direction between the first transmitting structure and the second transmitting structure is switched; and
when it is determined that the power transmitting direction between the first transmitting structure and the second transmitting structure is switched, adjusting a power transmission rate of the clutch such that a speed difference between the first transmitting structure and the second transmitting structure is reduced.

According to the above method, when the power transmitting direction between the first transmitting structure and the second transmitting structure is switched, the power transmission rate of the clutch is adjusted such that the speed difference between the first transmitting structure and the second transmitting structure is reduced. Therefore, by adjusting the power transmission rate of the clutch, the collision force of one of the transmitting structures with respect to the other can be reduced without depending on the change in the output of the driving source. Moreover, since the collision force is reduced by the clutch, i.e., by a method different from the change in the output of the driving source, the number of situations that the shock reduction is realized can be increased.

Tenth Aspect

A controller of a vehicle,
the vehicle including:
a power inputter including a driving source;
a driving wheel;
a first transmitting structure which is located on a power transmitting path and to which positive torque is given from the power inputter, the power transmitting path being a path through which power is transmitted between the power inputter and the driving wheel;
a second transmitting structure which is located on the power transmitting path and between the first transmitting structure and the driving wheel and is connected to the first transmitting structure so as to be movable relative to the first transmitting structure in a power transmitting direction within a range of a play; and
a sub power source that gives negative torque to the first transmitting structure, the negative torque being torque acting in a direction opposite to a direction in which the positive torque acts,
the controller including
processing circuitry configured to
determine whether or not a relative position of the first transmitting structure relative to the second transmitting structure changes, and
when it is determined that the relative position changes, control the power inputter and the sub power source such that collision force of one of the first transmitting structure and the second transmitting structure with respect to the other by the change in the relative position is reduced in at least a part of a period from a start time point of the change in the relative position to a termination time point of the change in the relative position.

According to the above configuration, both of the positive torque and the negative torque can be given to the first transmitting structure, and the torque given to the first transmitting structure to reduce the collision force of one of the first transmitting structure and the second transmitting structure with respect to the other is easily adjusted.

From the foregoing description, numerous modifications and other embodiments of the present disclosure are obvious to those skilled in the art. Accordingly, the foregoing description is to be construed as illustrative only, and is provided for the purpose of teaching those skilled in the art the best mode for carrying out the present disclosure. The structural and/or functional details may be substantially modified without departing from the scope of the present disclosure.

What is claimed is:

1. A controller of a vehicle, the vehicle including:
- a driving source that generates power;
- a driving wheel;
- a first transmitting structure located on a power transmitting path through which the power is transmitted between the driving source and the driving wheel;
- a second transmitting structure which is located on the power transmitting path and between the first transmitting structure and the driving wheel, is connected to the first transmitting structure so as to be movable relative to the first transmitting structure in a power transmitting direction within a range of a play, and contacts the first transmitting structure in the power transmitting direction to receive the power from the first transmitting structure;
- a clutch which is located on the power transmitting path and between the driving source and the first transmitting structure and changes a power transmission rate of the power transmitted from the driving source to the first transmitting structure; and
- a clutch actuator that operates the clutch, and the controller comprising processing circuitry configured to:
- determine whether or not a relative position of the first transmitting structure relative to the second transmitting structure changes; and
- when it is determined that the relative position changes, control the clutch actuator to change the power transmission rate such that collision force of one of the first transmitting structure and the second transmitting structure with respect to the other by the change in the relative position is reduced.

2. The controller according to claim 1, wherein when it is determined that the relative position changes, the processing circuitry selectively executes:
- a clutch control mode in which the processing circuitry controls the clutch actuator to change the power transmission rate such that the collision force of one of the first transmitting structure and the second transmitting structure with respect to the other by the change in the relative position is reduced; and
- a driving source control mode in which the processing circuitry controls the driving source to change an output of the driving source such that the collision force of one of the first transmitting structure and the second transmitting structure with respect to the other by the change in the relative position is reduced.

3. The controller according to claim 2, wherein when it is determined that the relative position changes, and it is also determined that the power transmission rate is less than 100%, the processing circuitry selects the clutch control mode.

4. The controller according to claim 2, wherein:
the driving source is an internal combustion engine; and
when it is determined that the relative position changes, and it is also determined that a state of the internal combustion engine is a predetermined unstable state, the processing circuitry selects the clutch control mode.

5. The controller according to claim 1, wherein:
the processing circuitry determines whether or not the relative position changes from a negative position to a positive position, by determining whether or not first switching occurs, the first switching being switching from a negative torque transmitting state to a positive torque transmitting state, the negative torque transmitting state being a state where torque is transmitted from the driving wheel to the driving source, the positive torque transmitting state being a state where the torque is transmitted from the driving source to the driving wheel; and
when it is determined that the first switching occurs, the processing circuitry controls the clutch actuator such that the power transmission rate is maintained at not more than a set transmission rate in at least a part of a period in which the relative position moves from the negative position to the positive position.

6. The controller according to claim 1, wherein:
the processing circuitry determines whether or not the relative position changes from a positive position to a negative position, by determining whether or not second switching occurs, the second switching being switching from a positive torque transmitting state to a negative torque transmitting state, the positive torque transmitting state being a state where torque is transmitted from the driving source to the driving wheel, the negative torque transmitting state being a state where the torque is transmitted from the driving wheel to the driving source; and
when it is determined that the second switching occurs, the processing circuitry controls the clutch actuator such that the power transmission rate is maintained at not more than a set transmission rate in at least a part of a period in which the relative position moves from the positive position to the negative position.

7. The controller according to claim 1, wherein:
the vehicle further includes a sub power source that generates power to be transmitted to the first transmitting structure without through the clutch; and
when it is determined that the relative position changes, the processing circuitry controls the sub power source to generate the power such that a speed difference between the first transmitting structure and the second transmitting structure is reduced.

8. The controller according to claim 7, wherein:
the sub power source is an electric motor; and
the processing circuitry switches the electric motor between a state where the electric motor generates regenerative braking power and a state where the electric motor generates driving power that rotates the driving wheel.

9. A method of controlling a vehicle, the vehicle including:
- a driving source that generates power;
- a driving wheel;
- a first transmitting structure located on a power transmitting path through which the power is transmitted between the driving source and the driving wheel;
- a second transmitting structure which is located on the power transmitting path and is connected to the first transmitting structure so as to be movable relative to the first transmitting structure within a range of a play; and
- a clutch which is located on the power transmitting path and between the driving source and the first transmitting structure and changes a power transmission rate of the power transmitted from the driving source to the first transmitting structure, and the method comprising:
- determining whether or not a power transmitting direction between the first transmitting structure and the second transmitting structure is switched; and when it is determined that the power transmitting direction between the first transmitting structure and the second transmitting structure is switched, adjusting a power transmission rate of the clutch such that a speed difference between the first transmitting structure and the second transmitting structure is reduced.

\* \* \* \* \*